United States Patent [19]

Roberts et al.

[11] 4,310,884

[45] Jan. 12, 1982

[54] MICROCOMPUTER-CONTROLLED PORTABLE SATELLITE SIGNAL SIMULATOR FOR EXPLORATION SYSTEMS, AND METHOD OF USE

[75] Inventors: F. Alexander Roberts, Brea; William V. Stiles; Robert C. Cosbey, both of Anaheim; John P. Duncan, Santa Ana, all of Calif.

[73] Assignee: Chevron Research Company, San Francisco, Calif.

[21] Appl. No.: 37,541

[22] Filed: May 9, 1979

[51] Int. Cl.³ .............................................. G06F 15/50
[52] U.S. Cl. .................................. 364/578; 364/459; 364/449; 343/100 ST; 434/111
[58] Field of Search ............... 364/449, 578, 579, 580, 364/200, 900, 459, 801, 448; 35/10.21; 235/302; 343/112 C, 100 ST

[56] References Cited

U.S. PATENT DOCUMENTS

| 3,191,176 | 6/1965 | Guier | 343/100 ST |
| 3,887,794 | 6/1975 | Katz et al. | 364/449 |
| 3,906,204 | 9/1975 | Rigdon et al. | 364/459 |
| 4,028,536 | 6/1977 | Woodward | 235/302 |

Primary Examiner—Charles E. Atkinson
Assistant Examiner—Gary Chin
Attorney, Agent, or Firm—J. A. Buchanan, Jr.; R. L. Freeland, Jr.; H. D. Messner

[57] ABSTRACT

In accordance with the invention, satellite navigation, receiver system of an exploration system for exploring for hydrocarbons in earth formations can be tested for fieldworthiness using a portable microcomputer-controlled satellite navigation simulator. From encoded inputs of local latitude, longitude, Greenwich mean time and antenna height, both array data parameters and real-time control signals are generated for simulating signals of an orbiting TRANSIT navigation satellite vis-a-vis the satellite navigation receiver system. To such system the received signals are indistinguishable from conventional TRANSIT satellite navigation signals. Result: by merely cross-checking simulator "turnkey" encoded data with the final computed fix, a technologist (who need not be a programming expert) can determine the fieldworthiness of the satellite navigation receiver system.

10 Claims, 12 Drawing Figures

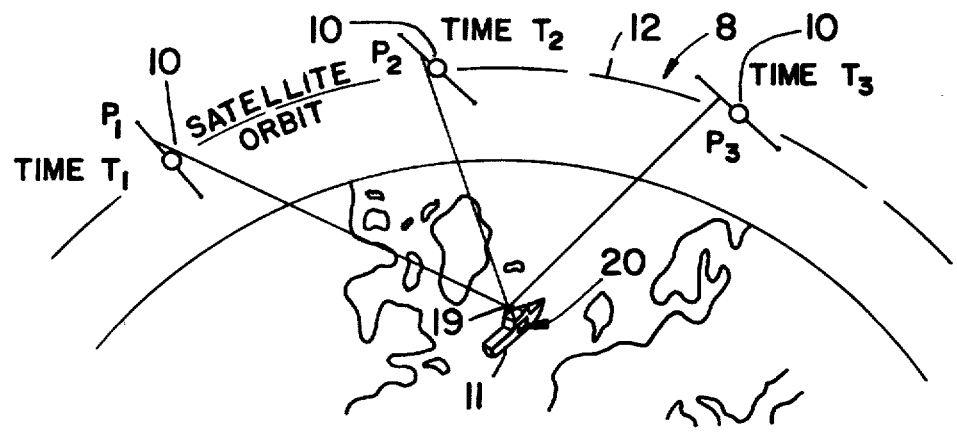
FIG_1
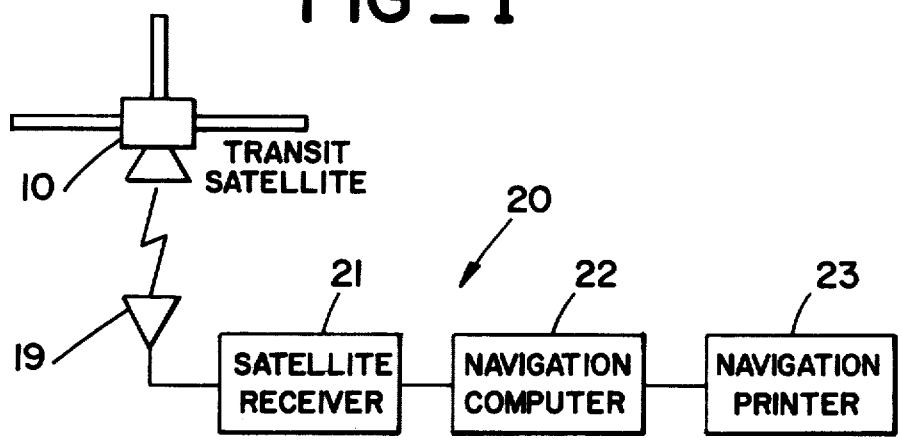
FIG_2
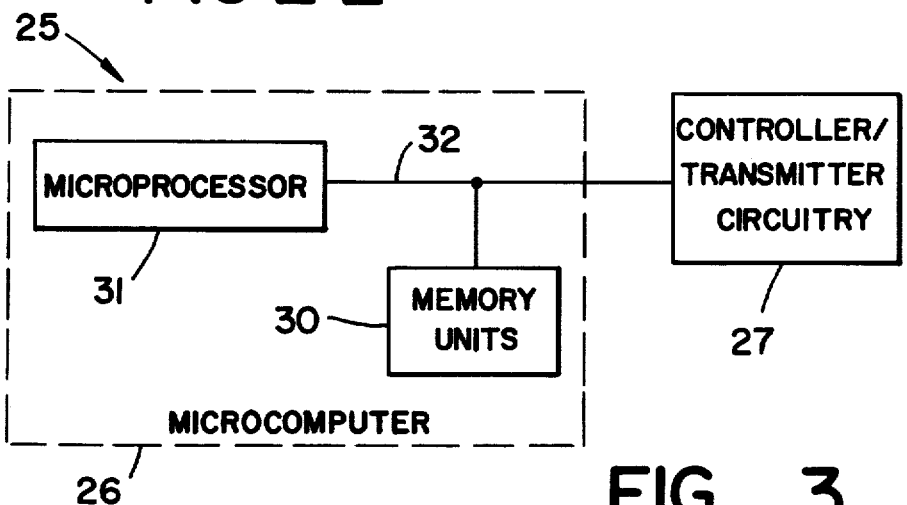
FIG_3

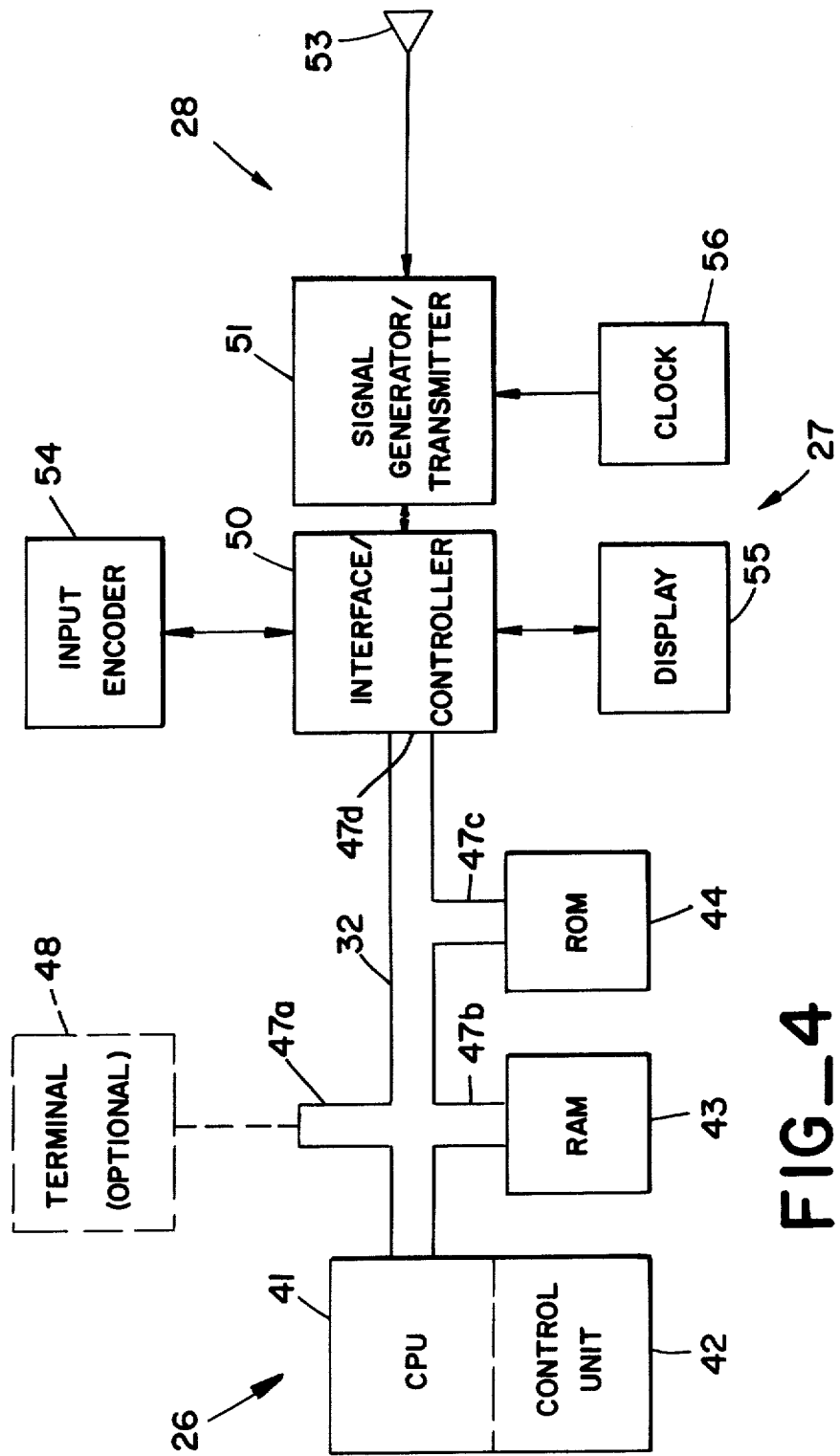

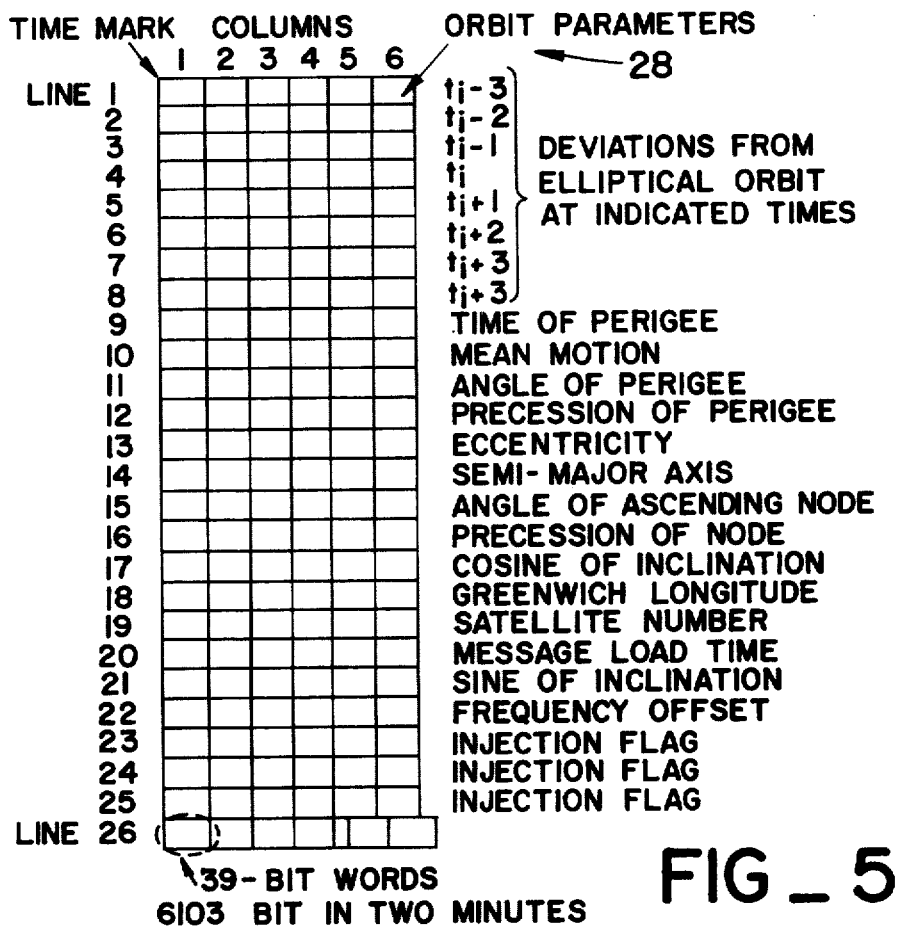
FIG_5
TWO-MINUTE MESSAGE ORGANIZATION OF THE SIMULATOR
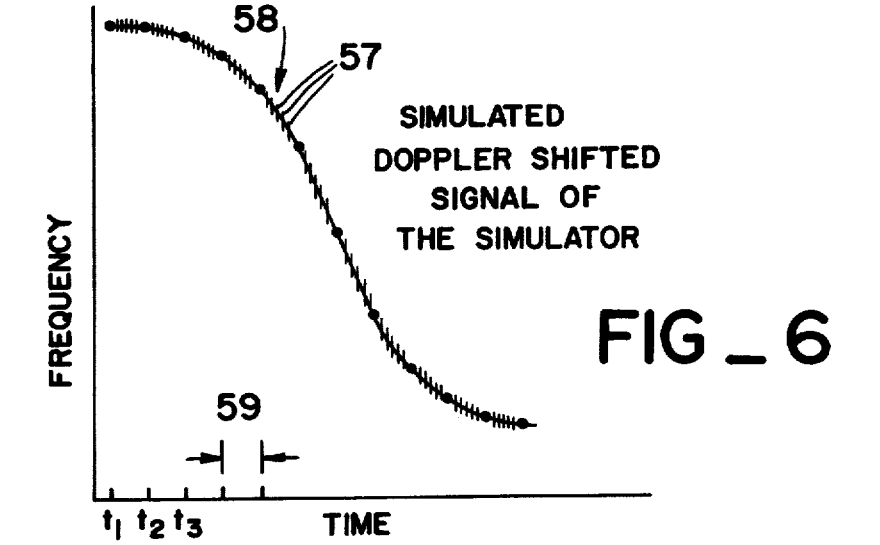
FIG_6

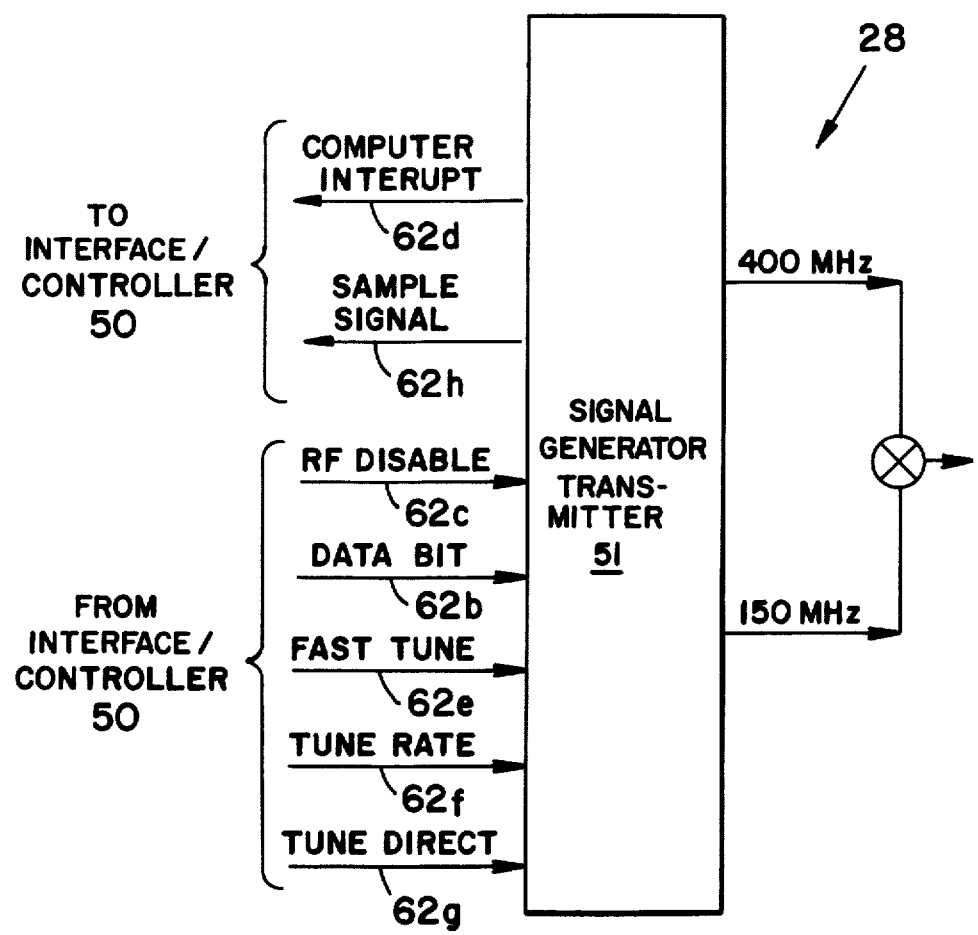
FIG_7

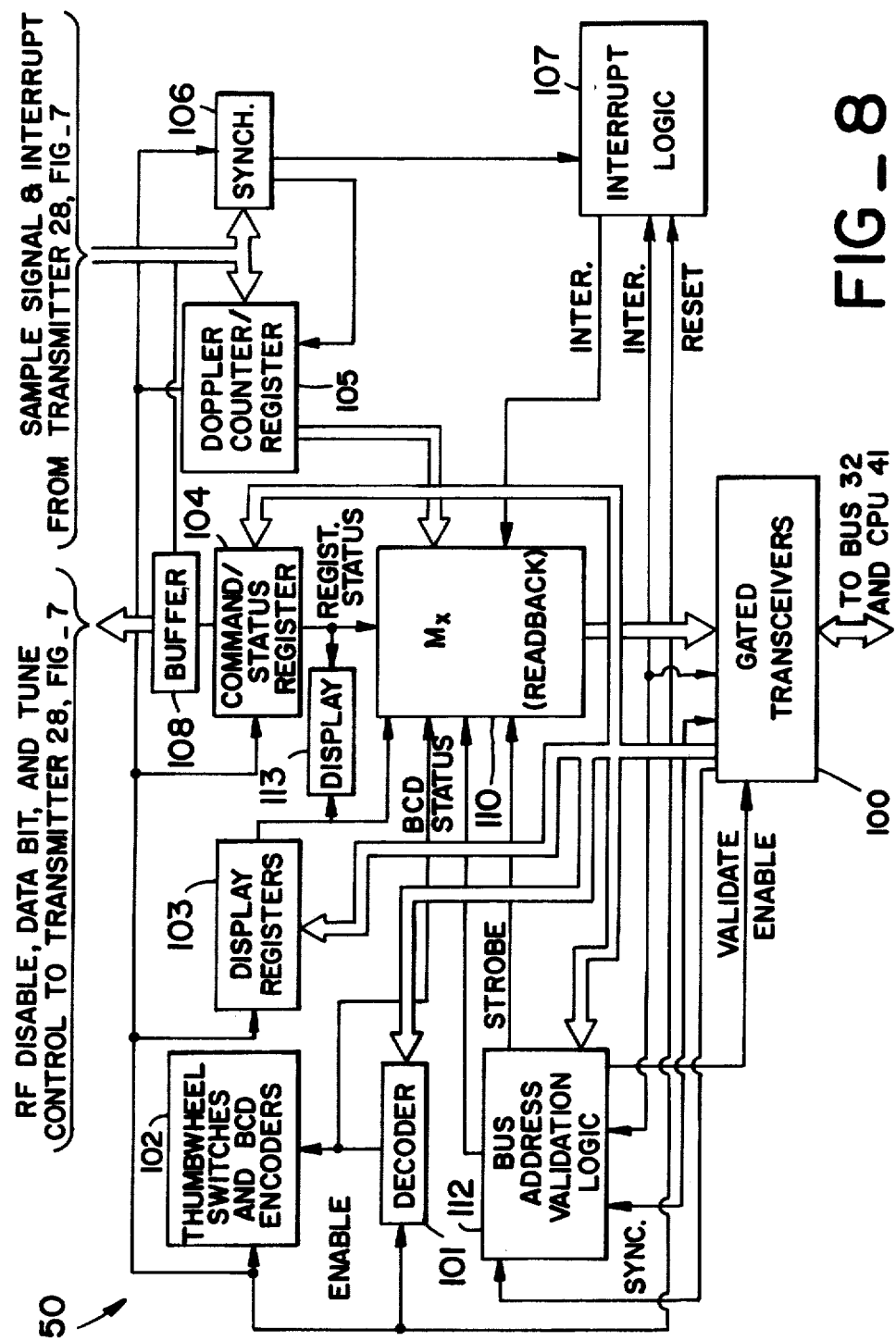
FIG_8

FIG_9
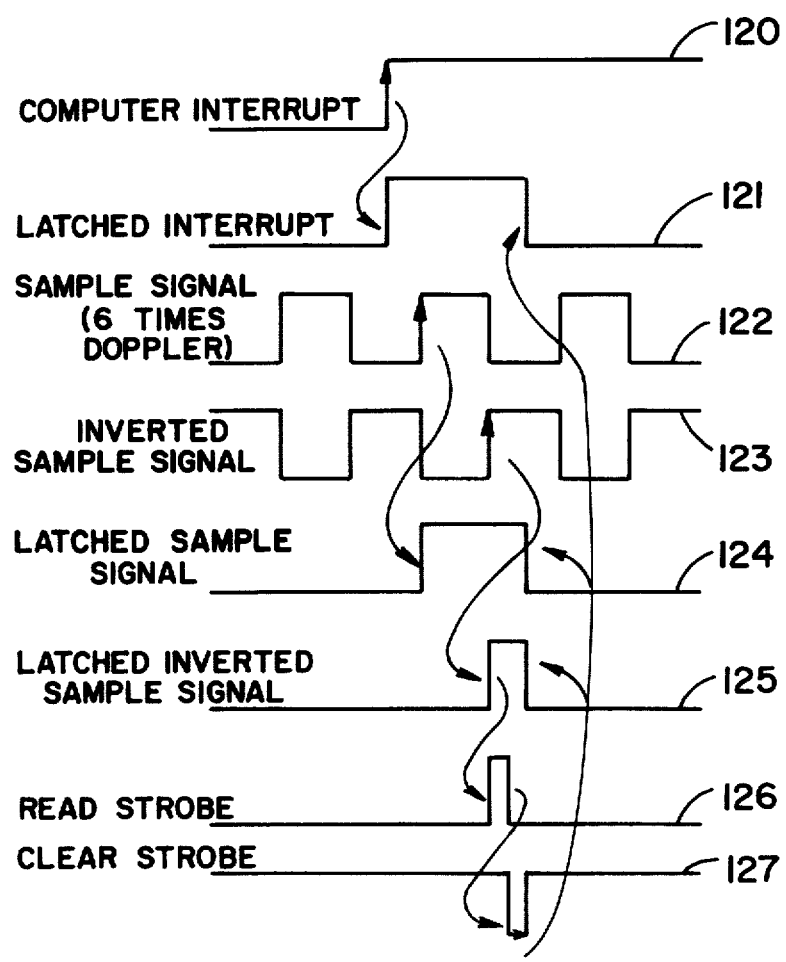

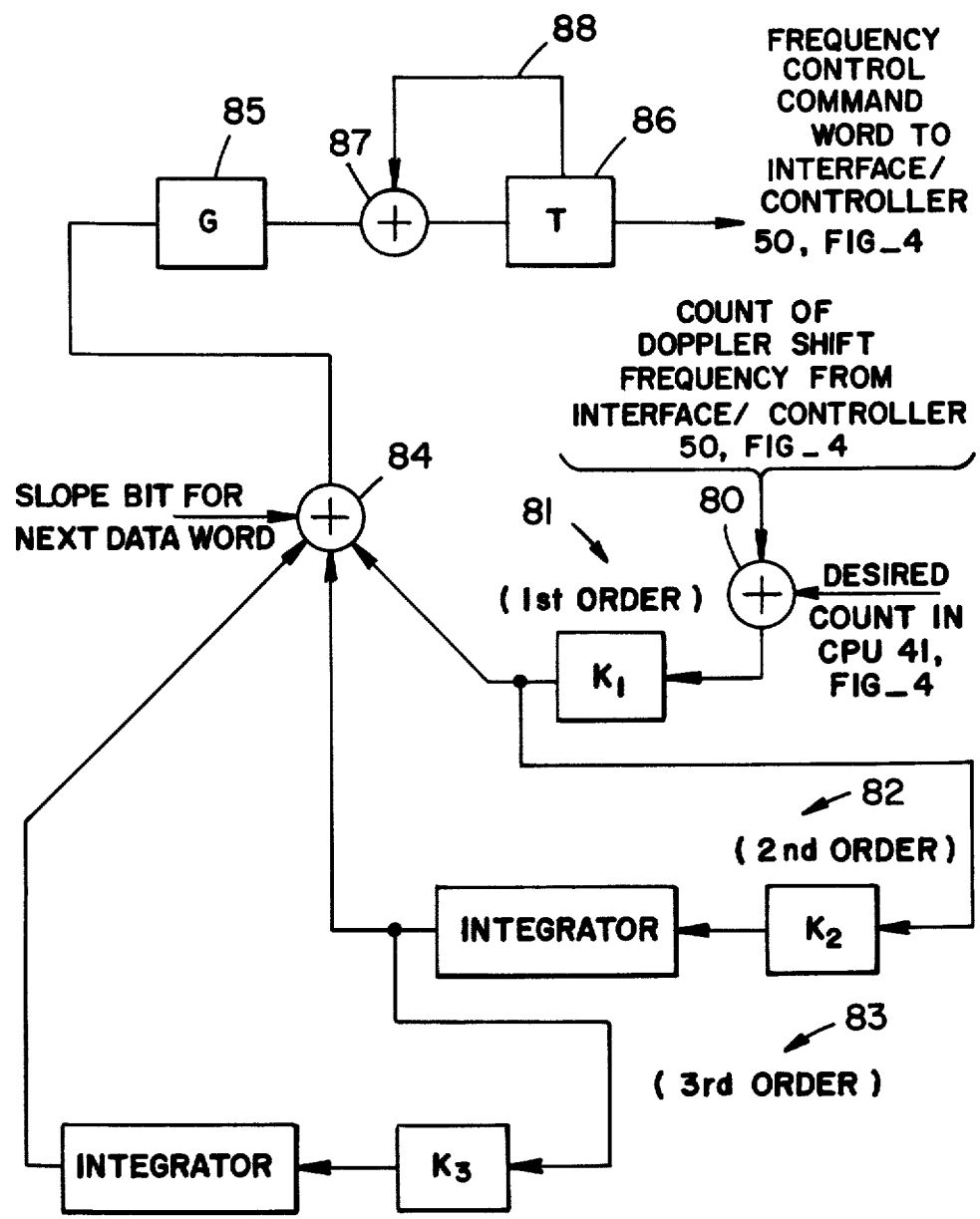
FIG _ 10

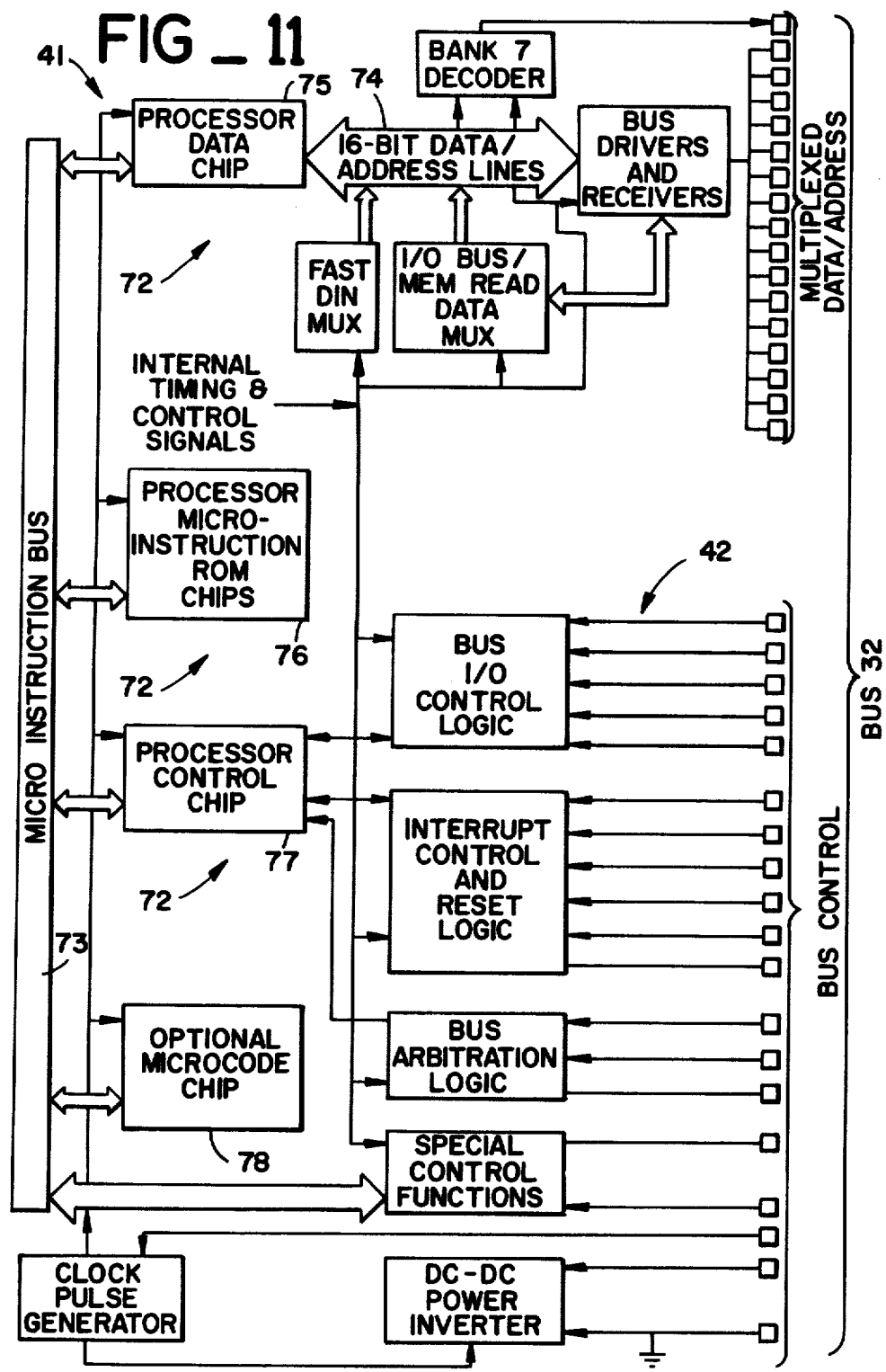

MICROCOMPUTER-CONTROLLED PORTABLE SATELLITE SIGNAL SIMULATOR FOR EXPLORATION SYSTEMS, AND METHOD OF USE

SCOPE OF THE INVENTION

The present invention relates to a highly portable signal simulator and method of use, for testing exploration system equipment, and more particularly to a microcomputer-controlled simulator for testing TRANSIT satellite navigation receiver systems of such exploration systems by simulating signals of a pseudo-orbiting TRANSIT navigation satellite. The simulator of the present invention simulates satellite signals with such accuracy that fieldworthiness of the tested satellite navigation receiver system can be assured by comparing the positional fix coordinates calculated by the system undergoing testing to the coordinates that the operator entered into the simulator.

BACKGROUND OF THE INVENTION

Oil exploration systems use a variety of geographical location techniques in order to associate collected seismic data with known geographical positional fixes. Marine exploration systems, of course can have more difficult problems than land-based systems, since the former carry on activities away from usual formalized land markers, say hundreds of miles at sea. A promising geographical-fixing tool used by modern exploration systems involves the use of signals from over-passing TRANSIT navigation satellites. The signals are indicative of location of the navigator and are recorded as seismic data are collected.

In the usual satellite navigation system, the satellite generates and transmits message data giving its orbital position in inertial coordinates as a function of time. E.g., as the latter orbits the earth the satellite is programmed to continuously read out a message from which its position can be computed together with precision time. The satellite navigation receiver system uses the satellite message data and its measurements of the Doppler shift of the satellite signals to compute its position fix.

It is necessary, however, that all parts of the satellite navigation receiver system (including the receiver antennas, the receiver, the Doppler counters and decoding logic, the receiver-to-computer interface hardware and the computer hardware and software) be operating correctly to produce an accurate fix. Moreover, there is a need for a portable satellite signal simulator and method to check the satellite navigation receiver system in the field. The test units of which we are aware test only individual parts of the satellite navigation receiver system, namely the Doppler counters and decoding logic, and do not test the entire satellite navigation receiver system from antenna input to resulting positional fix. There are additional problems in designing such a simulator: there is a variety of satellite navigation receivers to be used in association with even more varied computer systems. Since any one receiver can be used with a plurality of computer hardward-software, design of the simulator system can be even more difficult, especially when the tests are to be performed at sea by non-programming technologists.

SUMMARY OF THE INVENTION

In accordance with the present invention, a satellite navigation receiver system of an exploration system can be tested using a portable microcomputer-controlled satellite simulator system consisting of a microcomputer connected to a transmitter whose output can be controlled via the microcomputer's program. The result: a correctly modulated signal which to the antenna of the satellite navigation receiver system, is indistinguishable from that of a live satellite. The computer in the satellite navigation receiver system then calculates the position fix based on the pseudo signal, the latter thus being cross-checked with the local latitude and longitude entered into the simulator by the operator performing the test.

DESCRIPTION OF THE DRAWINGS

FIG. 1 is a schematic diagram illustrating operation of a satellite navigational system including a TRANSIT navigation satellite, for which simulation is sought, overflying a satellite navigation receiver system;

FIG. 2 is a schematic of the satellite navigation receiver system of FIG. 1.

FIGS. 3 and 4 are schematic diagrams of a satellite signal simulator in accordance with the present invention for providing signals to test the system of FIG. 2;

FIGS. 5 and 6 illustrate the nature of the satellite signal of the simulator;

FIGS. 7-10 illustrate further details of the simulator of FIGS. 3 and 4; and

FIG. 11 is a schematic diagram of a microprocessor system useful in carrying out method aspects of the present invention.

EMBODIMENTS OF THE INVENTION

Reference is now made to FIG. 1, which illustrates the TRANSIT navigation satellite system 8. The principles of operation of such a system 8 are of some importance to understanding certain aspects of the present invention and are presented below.

As shown, satellite 10 is pictured at several instants in time in travel along orbit 12 above an exploration system, say associated with exploration boat 11. Under usual circumstances, satellite 10 generates a message that is received by navigational circuitry 20 aboard boat 11. The ship-board navigational circuitry 20 includes receiving antenna 19 of known height operationally connected to the satellite navigation receiver 20 through a conventional transmission line, not shown.

For purposes of understanding how satellite 10 can be used to indicate position of boat 11, assume that the satellite 10 is steadily transmitting a very stable radio frequency, $F_T$, throughout travel along orbit 12; also assume that boat 11 is within radio line of sight of satellite 10 defined by time markers $t_1 \ldots t_3$ of FIG. 1. Since the navigation receiver-computer circuitry 20 includes a stable oscillator, a difference frequency $F_G$-$F_R$ can be produced by beating the oscillating reference frequency, $F_G$, against the frequency $F_R$ received from the satellite 10. The received frequency $F_R$ is not the transmitted frequency $F_T$ because it is modified by the relative velocity of the satellite, an effect commonly referred to as the Doppler shift. Furthermore, the satellite 10 emits recognizable time markers within its data message recognized at circuitry 20 as times of signal arrival modified by the incremental times of travel of the signal from position to position along the satellite orbit 12 relative to the boat position. Since the ship-board circuitry 20 also includes Doppler counters, the total number of beat cycles (the cycles of $F_G$-$F_R$) between the times of receipt of time markers of the data message from satellite 10 can be counted, that is, integrals such as $$N_{1,2} = \int_{t_1 + \Delta t_1}^{t_2 + \Delta t_2} (F_G - F_R) dt \quad (1)$$

where $t_1$ and $t_2$ are recognized time markers and $\Delta t_1$ and $\Delta t_2$ are the transmission path delay times, can be easily computed.

FIG. 2 illustrates satellite navigation receiver-computer circuitry 20 positioned aboard a boat 11 in more detail.

Normally, receiver 21 obtains the modulated signal (i.e., message data) from the over-passing satellite via antenna 19. Selected satellite message parameters are demodulated and sent to the computer 22 along with measurements of the Doppler frequency shift of the satellite signal (Doppler counts) from the Doppler counters. Computer 22 adjusts initial estimates of the boat position vis-a-vis the precise position of the satellite and provides a final position fix via printer 23.

In still more detail, from the satellite message data and assuming a latitude and longitude of the boat, the circuitry 20 first calculates slant range differences from the boat 11 of FIG. 1 to the satellite 10 for the time markers $t_1$, $t_2$, $t_3$ along orbit 12 that are also the boundaries for predetermined message bit intervals. Each message bit interval is associated with the same marker interval along the orbital path 12, but is modified by the incremental time of travel of the signal set forth above in regard to Equation (1). Thus, for each interval the number of beat cycles (Doppler count) can then be determined and hence by assuming a value of the satellite transmitted frequency $F_T$ a second estimate of the range difference is calculated from equation (1) by the shipboard navigation computer 22 of FIG. 2. The range difference equation can be expanded into a Taylor's series about the assumed latitude, longitude and satellite transmitted frequency. By dropping terms in the series higher than the first, a linear equation in terms of the errors in the assumed values is formed, viz.:

$$R(f_o) + \frac{\delta R(f)}{\delta f}(f - f_o) = R(\theta_o, \lambda_o) + \frac{\delta R(\theta, \lambda)}{\delta \theta}(\theta - \theta_o) + \frac{\delta R(\theta, \lambda)}{\delta \lambda}(\lambda - \lambda_o) \quad (2)$$

where $R(f_o)$ is the Doppler range difference assuming $f_o$ is the satellite transmitted frequency; $R(\theta_o, \lambda_o)$ is the range difference calculated from the message data and the assumed values of latitude ($\theta_o$) and longitude ($\lambda_o$) of the recever's antenna; (f-$f_o$), ($\theta$-$\theta_o$) and ($\lambda$-$\lambda_o$) are the errors in the original estimates; and the partial equations are evaluated at $f_o$, $\theta_o$, and $\lambda_o$. Observing a number of intervals along the satellite pass allows sufficient data to be collected to perform a least squares resolution of the errors, then by iteration, these errors converged to an acceptable limit.

However, unless the shipboard navigation circuitry 20 (and associated program) is properly functioning, the results provided by printer 23 can be erroneous, and render geographical annotations of seismic data (collected by the associated exploration system) useless.

In order to test operational fieldworthiness of shipboard navigation circuitry 20 (and associated program), the present invention provides in FIG. 3 a microcomputer-controlled satellite signal simulator 25. Purpose of simulator 25: to be placed adjacent to the satellite navigation circuitry and to provide signals which simulate an over-passing satellite in all detail so that all functions of the satellite navigation receiver system, can be cross-checked.

Simulator 25 includes microcomputer system 26 controlling controller/transmitter circuitry 27. System 26 includes a series of memory units 30 connected to microprocessor 31. A bus 32 operationally connects microprocessor 31 and memory units 30 to controller/transmitter circuitry 27, as explained in more detail below.

FIG. 4 shows operation of microcomputer system 26 and controller/transmitter circuitry 27 in still more detail.

Elements of the microcomputing system 26 for carrying out the present invention are preferably implemented in hardware manufactured by Digital Equipment Corporation, Maynard, Mass., as an LSI-11 or LSI-11/2 microcomputer system. Memory units 43 and 44 connect to CPU 41 and control unit 42 through the bus 32. Program memory unit 44 is a read-only-memory (ROM) of 12,288 16 bit words in which the simulator program is permanently stored. Memory unit 43 is a read-write random access memory (RAM) of 12,288 16 bit words that stores the simulator program when the simulator 25 is in the act of simulating satellite pass. Contents of memory 43 are usually erased and filled with the contents of memory 44 at the beginning of each simulated pass. CPU 41 can rapidly access various elements of the simulator by addressing particular ports, viz. ports 47a, 47b . . . 47d. Note that port 47a is shown optionally connectable to terminal 48. But it should be mentioned that the present invention usually operates in a "turn-key" portable mode with terminal 48 not present. Hence, all usual input/output interaction functions of a terminal 48 are either omitted or internally handled within CPU 41, control unit 42 or interface/controller 50, as explained below.

Circuitry 27 connects at port 47d of the bus 32 and includes an interface/controller 50 that controls and monitors a transmitter 28 which includes a digitally-controlled signal generator/transmitter 51 connected with antenna 53. An input encoder 54 and display 55 also operatively connect to interface/controller 50. A clock 56, which could be associated with the satellite navigation receiver system to be tested, is shown as functionally connectable to signal generator/transmitter 51, and paces operations as explained below.

The timing of the operations performed by the microcomputer 26 and controller/transmitter 27 during a pseudo satellite pass are controlled by the clock 56 which provides a five (5) megaherz pulse train with accurate and stable timing. For best test results, the accuracy and stability of clock 56 must be as good as that of the five (5) megaherz clock in the satellite navigation receiver system under test. Controller/transmitter 27 uses clock 56 to, among other things, derive a lower frequency clock that is sent, in the form of an interrupt, to the microcomputer 26. The time intervals of this derived clock correspond to the message bit intervals of the message transmitted by the pseudo satellite. The interrupt request thus generated, causes the control unit 42 to temporarily interrupt microcomputer 26 main program execution, jump to an interrupt service program that, as explained in more detail later, outputs the next Doppler shift frequency control command and satellite message bit to controller/transmitter 27 and inputs to microcomputer 26 the current count of the Doppler shift frequency being generated by controller/transmitter 27, after which microcomputer 26 returns to main program execution.

Generation of Data Arrays

Before starting a pseudo satellite pass, microcomputer 26 calculates the values of the satellite message bits and Doppler shift frequencies and rate of change (slope) frequencies to be used during the pass and stores these values in data arrays in memory 43. Microcomputer 26 obtains the parameters needed for calculating the values of the data arrays by inputing the parameters the operator set into the thumbwheel switches on the front panel of the simulator. These parameters include type of receiver to be tested, latitude and longitude of the test fix, Greenwich Mean Time (GMT) and receiver antenna height.

Within microcomputer 26, by setting the first perigee after message injection at the instant the satellite moves across the earth's equatorial plane, the following are easily calculated: time of the first perigee; the right ascension of the ascending node; and the orbit of the satellite with respect to the fix position. It should be pointed out that (i) the message injection time is usually made to be approximately 50 minutes before the time of perigee; (ii) the angle of closest approach can be either 20, 40 or 70 degrees; (iii) the satellite mean movement can be north or south, east or west of the fix position and (iv) the longitude of Greenwich is assumed to be the longitude of the first line of Aries at the instant of the first perigee.

Microcomputer 26 can, from the operator entered parameters, quickly calculate: (i) slant ranges related to Doppler count intervals; (ii) tropospheric refraction effects (iii) Doppler counts for each Doppler interval; (iv) satellite pass segment starting frequencies and slopes; and (v) the appropriate satellite message data. After storing these data in arrays in memory 43 microcomputer 26 in association with interface/controller 50 tunes the signal generator/transmitter 51 to the starting frequencies for the start of real time control of the pseudo satellite. But before discussing such control, a brief discussion of the signal content is in order and is presented below in association with FIGS. 5 and 6.

FIG. 5 illustrates a 2-minute satellite message segment and is typical of the message data generated by microcomputer 26, while FIG. 6 depicts Doppler shift as a function of time of the same signal. In this regard, the circuitry undergoing testing must demodulate the signal to reveal both message content as well as Doppler shift data simultaneously.

Returning to FIG. 5, each message comprises twenty-six (26) lines of six columns of thirty-nine (39) bit words, the last line having an extra nineteen (19) bits. It is the words in the sixth column of the message which contain the navigation data and the last two words of line twenty-six (26) which contain a synchronizing bit string which the circuitry under test must decode. All other data words are not decoded and therefore can contain a random bit pattern. Correction of the bit rate normally associated with real TRANSIT satellites are not generated by microcomputer 26, since hardware and software control of the message timing eliminates the need for these corrections.

In FIG. 6, each segment 57 of the modulated pseudo satellite signal 58 is defined by a starting frequency, a slope and an integration interval 59, with adjacent segments being connected at end points to form the signal 58 corresponding to the frequencies $F_R$ that would be received at the intervals 59 depicted. Note that segments 57 can be much smaller than interval 59. In fact in the simulator the segments 57 are message bit interval length and integration intervals 59 can be equal in time to one line of message data. Most receiver circuits use an integration period bounded to multiplies of a line of message data. Hence the simulator algorithm is independent of the receiver integration period. This is easily achieved since the Doppler count of the receiver is according to equation (1), equal to:

$$N_{12} = (f_T - f_G)(t_2 - t_1) - f_G(\Delta t_2 - \Delta t_1) \tag{3}$$

which is easily calculated from the geometry of the pseudo satellite and the fix position input to the simulator. Since the two frequency transmitted by the satellite are related, only one, the 400 MHz channel will be discussed here although the simulator in practice controls both the 400 MHz and 150 MHz signals. The Doppler count of the receiver as an integral of the segment frequency $(F+M)$ is, $$N_{12} = \int_{t_1}^{t_2} [(F_1 + M_2 t) - f_G] dt \tag{4}$$

which can be expanded as $$N_{12} = (f_4 - f_G)(t_2 - t_1) - [f_1(t_2 - t_1) + \frac{M_{12}}{2}(t_2 - t_1)^2] \tag{5}$$

where $f_4$ is the 400 MHz transmitted frequency and $f_1$ is the starting frequency and $M_{12}$ the slope of the segment time period 1,2.

Expanding equation (3) in terms of the 400 MHz and the normally 32 KHz offset frequency, such equation becomes:

$$N_{12} = (f_4 - f_G)(t_2 - t_1) - [f_3(t_2 - t_1) + f_G(\Delta t_2 - \Delta t_1)] \tag{6}$$

For equations (5) and (6) to be equivalent, thus:

$$f_1(t_2 - t_1) + \frac{M_{12}}{2}(t_2 - t_1)^2 = f_3(t_2 - t_1) + f_G(\Delta t_2 - \Delta t_1) \tag{7}$$

Therefore $$M_{12} = \frac{2[(f_3 - f_1)(t_2 - t_1) + (f_g(\Delta t_2 - \Delta t_1)]}{(t_2 - t_1)^2} \tag{8}$$

Each slope is calculated by equation (8). Before this procedure can be started, however, the first starting frequency must be calculated. This is obtained from the first order Doppler equation as set forth below.

$$F_R = F_T + \frac{F_T}{C} \frac{\delta R}{\delta t} \tag{9}$$

where $(\delta R)/(\delta t)$ is the range rate of change.

Hence, by a similar procedure of defining $F_T$ in its component parts of 400 MHz and 32 KHz (the offset frequency) and considering the range rate of change at the start of the simulated pass, the starting frequency of the first segment is, $$f_1 = f_3 + \frac{F_T}{C}\left(\frac{\delta R}{\delta t}\right) \tag{10}$$

This equation must also take into account the tropospheric refraction since this affects the range rate of change. Therefore, the total effective range is $$R_T = R_s + T \tag{11}$$

where $R_s$ is the range from the receiver to satellite and T is range increase due to tropospheric refraction. The function T is an emperical equation approximating the effect of the troposphere and has the form of $$T = \frac{K_1}{E(t) + K_2} \tag{12}$$

Therefore $$\frac{\delta R_T}{\delta t} = \frac{\delta R_s}{\delta t}\left[1 + \frac{T}{R_s(E(t) + K_2)}\left(\frac{R_s}{R_n} + E(t)\right)\right] \tag{13}$$

where $R_n$ is the radius of the earth at the fix position.

FIG. 7 illustrates operations of signal generator/transmitter 51 in more detail. In this regard since the signal generator/transmitter 51 is conventional in the satellite navigation art (e.g., Magnavox's Model No. 874-2574 has been found to be adequate in all operational aspects), only a brief description of signal generator/transmitter 51 operations together with interface/controller 50, FIG. 4 is set forth below.

FIG. 7 shows that the output of the signal generator/transmitter 51 is composed of a pair of signals: a modulated 400 MHz signal and a like modulated 150 MHz signal. Reason: the satellite navigation receiver system to be tested by the simulator of the present invention, requires the two signal frequencies to correct for the ionospheric refraction experienced with signals received from real transit satellites.

At the input of the signal generator/transmitter 51 are a variety of signals used to control the frequency and modulation of its output. All control signals are generated by interface/controller 50. While the signal generator/transmitter 51 can provide the clocking signal, it is usual and desirable to use the same 5 MHz source as is used by the satellite navigation receiver system under test.

The clocking signal paces operations within the signal generator/transmitter 51 to provide three conventional funtions, viz.: (i) to generate unmodulated 400 and 150 MHz signals which act as carrier signals, via multiplying circuits, not shown; (ii) to provide (via divider circuits, also not shown), a precision message bit interval and interrupt request; and (iii) to provide (via divider circuits, also not shown) clocks for 60-degree phase modulating the message data on the 150 MHz and 400 MHz carriers.

Within the signal generator/transmitter 51, the simulated Doppler shifted frequency is generated by additional circuitry conventional for this task under control of interface/controller 50 via lines 62e–62g. For this task, the simulated Doppler shifted frequency is generated at eighteen (18) times the shift required for the 400 MHz channel of the transmitter, allowing an easy means of dividing down to obtain 60-degree phase modulation and the 150 MHz channel Doppler shift. The eighteen (18) times Doppler frequency is also divided down to six (6) times Doppler frequency by a counter (not shown) in the signal generator/transmitter 51 and sent to the interface/controller 50 as sample signal (line 62h in FIG. 7) where it is counted and passed to microcomputer 26 for frequency error analysis and correction purposes.

FIG. 8 illustrates the interface/controller 50 in more detail.

As shown, microcomputer 26 can access various elements of interface/controller 50 such as decoder 101, BCD encoder 102, display register 103, command/status register 104, Doppler counter/register 105, internal synchronization circuitry 106 and interrupt logic circuitry 107 via bus 32 and gated transceivers 100.

Powering up the simulator causes microprocessor 31 to branch to a subroutine permanently stored in memory 44 that tests for the pressed condition of the start button not shown, on the front panel of the simulator. The operator initiates a pseudo satellite pass by entering the receiver type, latitude, longitude, time, and antennae height data into the thumbwheel switches and then pressing the start button.

By pressing the start button, the operator causes the following operations, inter alia: (i) the program stored in memory 44 is copied into memory 43 and put into execution; (ii) the programs of (i) above, causes the data contained in the front panel thumbwheel switches of encoders 102 to be an input to microprocessor 26, via decoder 101, readback multiplexer 110 gated transceivers 100 and bus 32; (iii) microcomputer 26 uses the data of (ii), supra, to calculate the previously mentioned data arrays; (iv) then microcomputer 26, using interface/controller 50, beings to perform real time control of signal generator/transmitter 51, and microcomputer 26 sends frequency control commands and message data to signal generator/transmitter 51 via bus 32, gated transceivers 100 command/status register 104, and buffer 108; (v) sample signal (6 times Doppler shift frequency) generated by signal generator/transmitter 51 is sent via line 62h (FIG. 7) to the interface/controller 50 to be counted by Doppler counter/register 105, whose count, on the occurrance of computer interrupt from signal generator/transmitter 51 (line 62d, FIG. 7) is sent via multiplexer 110, gated transceivers 100, bus 32 to CPU 41 where it is compared to the corresponding data array value for the purpose of calculating a correction value; and (vi) shortly after the interrupt and before the next clocking edge of sample signal occurs, Doppler counter/register 105 is cleared to zero in preparation for counting sample signal over the next message bit interval.

Not only does multiplexer 110 perform various switching and address functions so only one port, one set of drivers and one address validation circuit are needed within interface/controller 50, but it also is hardwired to provide the interrupt vector address via interrupt logic circuit 107 for timely transfer to microcomputer 26. Note also that the multiplexer 110 also aids the operator in diagnosing system errors, since the microcomputer 26 is programmed to provide an error code at display 113 and automatically does so as errors occur. Status of operations is likewise automatically indicated at display 113 through energization of various hardwired front panel status lights such as "FAIL", "RUHN", "PASS STARTED", "READY" and "RF ON", as such operations occur. Additionally, certain key addresses are likewise hardwired into the multiplexer 110. E.g., when a power-up signal is received at the multiplexer 110, a POWER-UP instruction and address can be assigned for transference to CPU 41. Result: memory 44 of microcomputer 26 can be entered at the proper point to initialize the system. Operations then commence, with correct pacing being provided by operation of synchronization logic circuit 106.

FIG. 9 illustrates operation of synchronization circuit 106 in some detail.

The purpose of synchronization circuit 106 is to prevent interference between the counting of the sample signal and the reading/clearing operations that occur asynchronously. At interrupt time, the computer interrupt represented by wave form 120 is latched into a flip-flop, not shown, at its upgoing edge, to generate a latched interrupt represented by waveform 121. The interrupt, in association with a NAND gate, not shown, enables an upgoing edge of the next sample signal (represented by waveform 122) to be latched into a second flip-fop (not shown) to generate a latched sample signal (waveform 124). The output of the second flip-flop allows the next upgoing edge of inverted sample signal (represented by waveform 123) to be latched into a third flip-flop not shown) to generate latched inverted sample signal (waveform 125). The output of the third flip-flop, when going high, triggers a one shot (also not shown) generating read strobe (waveform 126) whose upgoing edge causes the contents of Doppler counter portion of the Doppler counter/register 105 to be transferred to the register portion of the Doppler counter/register 105. Likewise, the subsequent downgoing edge of the output of the third flip-flop triggers a second one shot (also not show) generating clear strobe (waveform 127) that clears the counter portion of Doppler counter/register and all three of the above-mentioned latches to zero.

Note that the Doppler counter/register 105 of FIG. 8 provides a count of the Doppler shift frequency generated by signal generator/transmitter 51 during the interval between consecutive interrupts. Further, note that this interval is the satellite message bit interval. Such count can be trackted and transmitted back to CPU 41 by interface/controller 50. Within microcomputer 26, feedback correction logic is dynamically executed that uses the difference between the generated Doppler count and the desired Doppler count to calculate a correction factor that is added to the frequency control value in the command word that will be sent to the signal generator/transmitter 51 via interface/controller 50 when the next interrupt occurs.

FIG. 10 illustrates the nature of such corrective action in more detail.

As shown, within the microcomputer 26, the measured count of the generated Doppler shift frequency are first compared with the desired count, as via elements within microcomputer 26 equivalent to a comparer 80. The difference value then passes through a series of stages equivalent in function to control loops 81, 82 and 83, which provide results which are added (or subtracted) to the slope value of next command word equivalent in function to operation of a summer 84. As changes occur, a new slope signal is generated and slope values in cycles per bit (message bit interval) squared are converted in a functional equivalent to converter 85 to like values in terms of Hertz per second, and then the signal undergoes truncation within the equivalent of truncator 86 where least significant digits of the slope values are dopped. Result: the slope provided by the subsequently executed command word aids to bring the signal generator 51 of FIG. 4 back to within system limits. Between the functional equivalents of converter 85 and truncator 86 an additional functional step equivalent to summer 87 connected by feedback loop 88 containing the fractional remainder, if any, of the truncator 86.

It should be noted that in some cases interface/controller 50 can be omitted, provided the user increases the task load of microcomputer 26. Also, the corrective action schematically illustrated in FIG. 10 is entirely performed by microcomputer 26. Hence, a more detailed description of CPU 41 and control unit 42, is in order and is prescribed below in conjunction with FIG. 11.

As shown, the CPU 41 include an array of control, data, microinstruction and optional chips generally indicated at 72, all internally tied together through an internal microinstruction bus 73. Externally, both address and data communication to other elements of the microcomputer occurs via 16-bit data/address lines 74.

Data chip 75 contains conventional microscale elements including an arithmatic logic unit (ALU) and register arrays familiar to those skilled in the microcomputer art. (See e.g., the handbook "Microcomputer Processors", Digital Equipment Corporation, (1978) describing its LSI-11 microprocessor in detail).

Microinstruction chips 76 contain microinstructions controlled via control chip 77. That is to say, the control chip 77 generates, in sequence, microinstruction addresses which are used to access microinstruction chip 76. As a result, instructions are transferred to data and control chips 75, 77, as required. In operations while most of the microinstructions are executed by data chip 74, note that various jumps, branches, and I/O operations can be executed in the control chip 76. Arithmatic steps equivalent to those shown in FIG. 10 are carried out within ALU of the data chip 75 in conjunction with various other elements of the CPU 41. Floating point logic is provided via optional chip 78.

Having now briefly described the operations of the apparatus of the present invention, a listing of the program is presented below, containing a full instruction set for operation. Within the listing, note that after the data have been set, the program executes a "CALL USRIPL" instruction. Its purpose: to detect if a terminal is attached to the microcomputer system and if not (the usual use), to reroute the program EMT (emulation trap) vectors and trap vectors to new software addresses. In that way, the issuance of proper terminal instructions is avoided, say in a typical situation when the apparatus and method of the present invention are used in a field environment. But note that all error messages common to a keyboard output appear at display 113, FIG. 8.

Other call instructions of interest and other functions are set forth below.

| Instruction | Function |
| --- | --- |
| Call DATAIN | Encodes latitude, longitude, etc., data |

| Instruction | Function |
|---|---|
| | from encoders 102, FIG. 8; |
| Call CLRINT | Clears RF and interrupt enables; |
| Call ONINT | Enables interrupt; |
| Call LAND | Sets forth logical "AND" instructions; |
| Call LITON | Sets panel lights at display 113, FIG. 8; |
| Call LITOFF | Kills panel lights at display 113, FIG. 8; |
| Call SETUP | Sets up interrupt service subroutine; |
| Call STATOT | Sets bits in status register 104, FIG. 8. |
| Call FAIL | Sets "Fail" Code in lights at display 113, FIG. 8; |
| Call DELAY | Enables delay for a particular receiver type encoded from encoders 102, FIG. 8; |
| Call PRINT | Provides for print instructions if a teletype is present; |
| Call EXIT | Flashes "Ready" code in lights at display 113, FIG. 8, and then when the start button is activated at validity circuit 112, FIG. 8, copies program listing into the CPU 41, FIG. 4. |

In the listing, note also that the statements numbered 0001-0426 set forth the method by which the data base of the present invention is established, while statements numbered 0427-END relate to, inter alia, the controlled generation of the pseudo-satellite signal. In dynamically controlling the transmitter 28, FIG. 7, in accordance with the numbered statements 0427 et seq., data-command iteration is paramount. That is to say, data-command words associated with statements 0001-0426 are incrementally controlled to provide the following command functions associated with the bit order set forth in detail below:

| BIT ORDER | Function |
|---|---|
| BITS 0,1 ... 5 | Rate of change of tuning for the transmitter 28, FIG. 7; |
| BIT 6 | ON-OFF tuning control, i.e., enable, disable state for the tuning circuitry; |
| BIT 7 | Tune direction; |
| BIT 8 | Selection for FAST/SLOW TUNING; |
| BIT 9 | Extract DATA bit; |
| BIT 10 | RF Enable control; |
| BITS 11-14 | Light control at display 113, FIG. 8; |
| BIT 15 | Interrupt Enable. |

The scope and breadth of intended coverage are not to be delimited by the descriptions set forth above, inasmuch as substitutions are readily apparent to those skilled in the art. For example, the functions of the interface/controller 50 of FIG. 4 could be carried out within the microprocessor system with the addition of programming instructions as previously mentioned, provided the signal generator/transmitter 51, FIG. 4, is modified to generate interrupt signals independent of multiplexer 110, FIG. 8. Also, the field of use need not be limited to marine applications, as the present invention could be used to test those land-based systems that use satellite navigation-positioning circuitry. Accordingly, the invention is to be given the broadest interpretation within the terms of the following claims.

```
FORTRAN IV                    VOIC-03A

C
C            SATNAV FORTRAN MAIN PROGRAM
C
C            CHEVRON OIL FIELD RESEARCH COMPANY
C            DIVISION STANDARD OIL COMPANY OF CALIFORNIA
C            LA HABRA
C            CALIFORNIA
C
C
C
C
C
C
C
C
C
C
C
C
C
C
C
C
C
C
C
C
C
C            THIS PROGRAM WAS COMPILED UNDER DIGITAL EQUIPMENT CORP'S
C            RT-11 SOFTWARE SYSTEM AND USES DEC'S RT-11 FORTRAN
C            STAND-ALONE CAPABILITY
C
C       COMPILE:   SATM2,LP1/S/V/P/U/N:1/R:100=SATM2
C
C       LINK:   SATM2,LP1=SATM2,DATAIN,UTILX,EXIT3,USRIPL/F/L/T/B:1200/C
C               PRINT1
C
C            NOTE, EXIT3 IS MODIFIED EXIT2 FOR 12K MACHINE
C            LIBRARY SEARCH
C
C            SSUBRT<CR>
C            SSIPRT<CR>
C            S12K<CR>
C            <CR>
C
C       SWITCHES
C            S - SUPPRESS ISN NUMBERS
C            V - SUPPRESS ARRAY VECTORING
C            P - DISABLE 'GLOBAL' OPTIMISER
C            U - PREVENT USR FROM CHANGING AT RUNTIME
C            N:1 - ENABLE 1 LOGICAL UNIT
C            R:100 - RECORD SIZE IS 100
```

```
C           FORTRAN LIBRARY IS BUILT FOR LSI-11 WITH EIS/FIS
C           -----
C
C
C           TO CHANGE DELAY SET NRX=9 AND
C           TIME AS FOLLOWS
C
C           10XY - POSITIVE RX DELAY +X.Y MS
C           11XY - NEGATIVE RX DELAY -X.Y MS
C           THESE DELAYS ARE ADDED TO NOMINAL 2.7 MS
C
C           TO CHANGE PASS GEOMETRY SET NRX=8 AND
C           TIME=0XYZ
C
C           Z=1 20 DEGREES PASS
C           Z=2 40 DEGREES PASS(DEFAULT)
C           Z=3 70 DEGREES PASS
C           Y=1 PASS EAST OF NAVIGATOR(DEFAULT)
C           Y=2 PASS WEST OF NAVIGATOR
C           X=1 NORTH GOING PASS(DEFAULT)
C           X=2 SOUTH GOING PASS
C
C
0001        DIMENSION SLANT(209)
0002        DIMENSION NFIX(17,9)
0003        DIMENSION NVAR(20,9)
0004        DIMENSION NBK(20)
0005        DIMENSION MSKDAT(8)
0006        DIMENSION ILANT(418)
0007        EQUIVALENCE (SLANT(1),ILANT(1))
0008        INTEGER ILT(7),ILG(8),IAN(3),ITM(4)
0009        REAL YRX(7)
0010        DOUBLE PRECISION XPK,YPK,XSK,YSK,XK,YK,ZK,DR1,DR2,DR3
0011        DOUBLE PRECISION XNK,YNK,ZNK
0012        DOUBLE PRECISION YM,SK1,XD
0013        DOUBLE PRECISION ORANGE,RANGE,FREQ,E1,E2,SK,TK,EM,BK
0014        DOUBLE PRECISION XT,TWOMN,TEMP,T,XN,EN,WE,EL,AO,XFREQ
0015        INTEGER TTFLAG
C
C           DATA STATEMENTS FOR INPUT
C
0016        DATA NFIX/3,11,11,11,11,11,3,11,11,11,11,11,11,11,11,11,
     2             3, 6, 3, 3, 3, 3,3, 3, 3, 3, 3, 3, 4, 3, 3, 3, 3,
     3             3, 9, 3, 3, 3,10,3, 3, 3, 3, 3, 3, 4, 3, 3, 3, 3,
     4             3, 8, 3, 3, 3, 7,3, 3, 3,10, 3, 3, 3, 3, 3, 3, 3,
     5             3, 7, 3, 3, 3, 9,3, 3, 3,15, 3, 3, 5, 3, 3, 3, 3,
     6             3, 3, 3, 3, 3, 7,3, 3, 3,10, 3, 3, 3, 3, 3, 3, 3,
     7             3, 5, 3, 3, 3, 8,3, 3, 3,10,12, 3, 3, 3, 3, 3, 3,
     8             3, 9, 3, 3, 3,10,3, 3, 3,10,11, 3, 3, 3, 3, 3, 3,
     9             3, 3, 3, 3, 3,3, 3, 3, 3, 3, 3, 3, 3, 3, 3, 3, 3/
C
0017        DATA NVAR/180*35/
C
C           XRX IS RECEIVER BEAT FREQUENCY WAVELENGTH IN KM.
C
0018        DATA XRX/7.4957872E-4,
     2             7.4948110E-4,
     3             7.4948110E-4,
     4             7.4948110E-4,
     5             7.4948110E-4,
     6             7.4954126E-4,
     7             7.4957872E-4/
C
0019        DATA NBK/10,2,5,12,0,8,7,6,8,0,0,0,0,3,15,15,15,15,15,8/
C
0020        DATA MSKDAT/1,2,4,8/
C
0021        ISECT=1                                              *ISN 01*
C
C           USRIPL IS "USER IPL". THIS SUBPROGRAM SIGNALS A
C           SUCCESSFUL COPY DOWN AND START-UP OF THE PROGRAM
C           BY SETTING THE 'RUN' LIGHT.
C           USRIPL MODIFIES THE FORTRAN TRAP HANDLERS TO ALLOW
C           THE FORTRAN TO RUN WITHOUT A TTY IF NON IS PRESENT.
C           ERROR MESSAGES ARE REROUTED TO THE PTSS LIGHT DISPLAY.
C
0022        TTFLAG=0
0023        CALL USRIPL(TTFLAG,ISECT)
C
C           INTEGERS 0-10 FOR CALLS TO DATAIN
C
0024        INT0=0
0025        INT1=1
0026        INT2=2
0027        INT3=3
0028        INT4=4
0029        INT5=5
0030        INT6=6
0031        INT7=7
0032        INT8=8
0033        INT9=9
0034        INT10=10
0035        L=0
C
C           CALL DATA-IN
C           INT0 IS USED TO TO SIGNAL DATAIN TO ASK THE USER WHETHER
C           HE WISHES TO INPUT PARAMETERS FROM THE KEYBOARD OR FROM
C           THE FRONT PANEL. IT IS LEFT IN FOR FUTURE DIAGNOSTIC
C           PURPOSES.
C
C           THE TYPICAL FORMAT FOR A DATA-IN CALL IS:
C
C           CALL DATA-IN(INT3,ILT(4),ILT(3),ILT(2),ILT(1))
C
C           HERE, INT3 SIGNALS THAT WE ARE READING LATITUDE DEGREES
```

```
              C             AND MINUTES.
              C
              C             THUS, IF LATITUDE WERE 37 DEG 41,XXX MIN, WE WOULD HAVE
              C                    ILT(1) = 3
              C                    ILT(2) = 7
              C                    ILT(3) = 4
              C                    ILT(4) = 1
              C
0036     3333 CONTINUE
              C
              C             SET ROUTE FLAG
              C
0037          IDEV=0
              C
              C             FIXED INPUT PARAMETERS
              C
0038          DEGLT=33.0
0039          DEGLN=-118.
0040          ANTHT=0.
0041          ITIME=0.
0042          NRX=1
              C
              C             INITIALIZE
              C             XD ADDITIONAL DELAY
              C             XEA SET FOR 90 DEGREES EAST PASS
              C             XSN SET FOR NORTH GOING PASS
              C
0043          XEA=9.0
0044          XSN=0.0
0045          XD=0.0
              C
              C             MAXIMUM NUMBER OF RECEIVERS IS 7
              C
0046          NRXMX=7
0047          ISECT=2
0048          CALL DATAIN(INT0,TTFLAG)                                    *ISN 02*
0049          ISECT=4
0050     3334 CALL DATAIN(INT1,NRX)                                       *ISN 04*
0051          ISECT=6                                                     *ISN 06*
0052          INT1=1
              C
              C             CHECK ROUTE,IF NRX=8 OR 9 IN TEST MODE
              C
0053          IF(NRX.GT.7) GO TO 4
              C
              C
              C             START PROGRAM
              C             VERIFY VALIDITY OF RECEIVER NUMBER.
              C
0055          IFAIL=101
0056          IF(NRX.GT.NRXMX) GO TO 2222
              C
              C                 READ IN AND CHECK LATITUDE
              C
0058          IFAIL=102
0059          ISECT=8
0060          CALL DATAIN(INT3,ILT(4),ILT(3),ILT(2),ILT(1))               *ISN 8*
0061          ISECT=10
0062          CALL DATAIN(INT4,ILT(7),ILT(6),ILT(5))                      *ISN 10*
0063          ISECT=12                                                    *ISN 12*
0064          CALL DATAIN(INT5,NLT)
0065          ISECT=14                                                    *ISN 14*
0066          I=10*ILT(1)
0067          I=I+ILT(2)
0068          IF(I.GT.90) GO TO 2222
0069          XK=FLOAT(I)
0070          I=10*ILT(3)
0071          I=I+ILT(4)
0072          IF(I.GT.59) GO TO 2222
0073          IF(I.GT.59) GO TO 2222
              C
              C             CONVERT LATITUDE TO +/-DEG.FFFFFF AND PUT IN 'DEGLT'.
              C
0075          IFAIL=0
0076          XNK=FLOAT(I)
0077          I=1000*ILT(5)
0078          I=I+(100*ILT(6))
0079          I=I+(10*ILT(7))
0080          XPK=FLOAT(I)/10000.
0081          DEGLT=XK+((XNK+XPK)/60.)
0082          T=FLOAT(NLT)
0083          DEGLT=DEGLT*T
              C
0084          ISECT=16                                                    *ISN 16*
0085          IFAIL=103
              C
              C
              C             READ IN AND VERIFY LONGITUDE
              C
0086          CALL DATAIN(INT6,ILG(1))                                    *ISN 18*
0087          ISECT=18
0088          CALL DATAIN(INT7,ILG(5),ILG(4),ILG(3),ILG(2))               *ISN 20*
0089          ISECT=20
0090          CALL DATAIN(INT8,ILG(8),ILG(7),ILG(6))                      *ISN 22*
0091          ISECT=22
0092          CALL DATAIN(INT9,NLG)                                       *ISN 24*
0093          ISECT=24
0094          I=100*ILG(1)
0095          I=I+ILG(2)*10
0096          I=I+ILG(3)
0097          IF(I.GT.180) GO TO 2222
0098          XK=FLOAT(I)
0099          I=10*ILG(4)
0100          I=I+ILG(5)
0101          IF(I.GT.59) GO TO 2222
0104          IFAIL=0
              C
              C             CONVERT TO +/-DEG.FFFFFF AND STORE IN 'DEGLN'.
```

```
0105        YNK=FLOAT(I)
0106        I=1000*ILG(6)
0107        I=I+(100*ILG(7))
0108        I=I+(10*ILG(8))
0109        YPK=FLOAT(I)/10000.
0110        DEGLN=YK+((YNK*YPK)/60.)
0111        T=FLOAT(NEG)
0112        DEGLN=DEGLN*T

0113        ISECT=26                                                        *ISN 26*

C
C           READ ANTENNA HEIGHT(H) IN METRES - STORE IN 'ANTHT',
C
0114        CALL DATAIN(INT2,IAN(3),IAN(2),IAN(1),NAN)
0115        ISECT=28                                                        *ISN 28*
0116        I=100*IAN(1)
0117        I=I+IAN(2)*10
0118        I=(I+IAN(3))*NAN
0119        ANTHT=FLOAT(I)

C
C           READ TIME IN GMT (UNIVERSAL TIME), 24 HOUR CLOCK,
C           STORE AS MINUTES PAST MIDNIGHT IN 'ITIME'.
C
0120        ISECT=30
0121      4 CALL DATAIN(INT10,ITM(4),ITM(3),ITM(2),ITM(1))                  *ISN 30*
0122        IF(NRX.EQ.8) GO TO 82
0124        ISECT=32                                                        *ISN 32*
0125        I=1000*ITM(1)
0126        I=I+ITM(2)*100
0127        I=I+ITM(3)*10
0128        ITIME=I+ITM(4)

C
C           IF RECEIVER NUMBER IS 8 OR 9, NRX IS REREAD
C           WITH INT1=11
C
0129        IF(NRX.LE.7) GO TO 3
0130        IFAIL=111
0132        IF(ITIME.LT.1001.OR.ITIME.GT.1159) GO TO 2222
0134        IF(ITIME.GT.1100) ITIME=-ITIME+1100
0135        IF(ITIME.GT.1000) ITIME=ITIME-1000
0136        XNK=FLOAT(ITIME)
0137        AP=YNK/600000.
0138        GO TO 83
0140     82 IF(ITM(4).EQ.1) XEA=17.0
0142        IF(ITM(4).EQ.3) XEA=1.0
0144        IF(ITM(3).EQ.2) XEA=-1.0*XEA
0146        IF(ITM(2).EQ.2) XSN=3.141592654
0148     83 INT1=11
0150        GO TO 3334
0151      3 CONTINUE

C
C           EL WAVELENGTH OF RECEIVER OFFSET FREQ
C
0152        EL=XRX(NRY)

C
C           SYSTEM CONSTANTS
C
C           FEEDBACK CONSTANTS CON1,CON2,CON3
C           SATELLITE OFFSET FREQ,XFRQ, XFREQ IS IN HZ PER BIT
C           CONVERT DEGREES TO RADS,  CAY1 = 3.1415.../180,
C           SAT SEMI-MAJOR AXIS,AO KM
C           EARTH FLATTENING,F
C           EARTH EQUATORIAL RADIUS,A KM
C           EARTH ROTATION RATE,WE RAD/MIN
C           SAT MEAN MOTION,EN RAD/MIN
C
0153        CON1=0.03
0154        CON2=CON1/3.4
0155        CON3=CON2/2.0
0156        XFREQ=5.30+2
0157        CAY1=1.74532925E-2
0158        AO=7.464570+3
0159        F=1.0/298.25
0160        A=6378.135
0161        WE=4.37526950-3
0162        EN=5.87373560-2

C           CONVERT TIME TO MINUTES AND CHECK NOT GT 23HOURS
C           AND MINUTES NOT GT 59
C
0163        IFAIL=105
0164        ISECT=38                                                        *ISN 38*
0165        IXMD=ITIME/100
0166        IF(IXMD.GT.23) GO TO 2222

0168        I=ITIME-IXMD*100
0169        IF(I.GT.59) GO TO 2222
0171        IFAIL=0

C
C           ITIME IN THE 2-MINUTE INTERVAL
C
0172        ITIME=IXMD*60+I
0173        ITIME=(ITIME/2)*2

C
C           TIME=ITIME REAL,SET EQUAL TO TIMER ON 2-MIN INTERVAL
C
0174        TIME=FLOAT(ITIME)
0175        TIMER=TIME

0176        ISECT=40                                                        *ISN 40*
C           CALCULATE NAVIGATOR X,Y,Z
C
```

```
0177        RADLT=DEGLT*CAY1
0178        RADLN=DEGLN*CAY1
0179        ANTKM=ANTHT/1000.0
0180        D=SQRT(1.0-F*(2.0-F)*SIN(RADLT)*SIN(RADLT))
0181        TEMP=(A/D+ANTKM)*COS(RADLT)
0182        XNK=TEMP*COS(RADLN)
0183        YNK=TEMP*SIN(RADLN)
0184        ZNK=(A*(1.0-F)*(1.0-F)/D+ANTKM)*SIN(RADLT)
0185        R2=SQRT(XNK*XNK+YNK*YNK+ZNK*ZNK)
        C
        C           CAL SAT LONGITUDE
        C
0186        DEL=XEA/COS(RADLT)
0187        RSTLN=RADLN+(DEL*CAY1)*XSN
0188        IF(XSN.EQ.0.0) RADLT=-RADLT
        C
        C             RIGHT ASCENSION,ASCENDING NODE ALSO
        C             NEEDED IN RCOX3 FOR FIXED PARAMETS
        C             TRUNCATED TO FOUR DEC DIGITS
        C
0190        OOP=RSTLN+(HE*(XSN-RADLT)/EN)
0191        OOP=OO/CAY1
0192        XOOP=FLOAT(IFIX(OOP))
0193        OOOP=OOP-XOOP
0194        LOOP=IFIX(OOOP*10000.)
0195        OOP=XOOP+FLOAT(LOOP)/10000.
0196        OO=OOP*CAY1
        C
        C
        C           TIME OF PERIGEE IN MINUTES (AT EQUATOR)
        C           ALSO NEED IN RCOX3 FOR FIXED PARAMETERS
        C
0197        ISECT=42                                          *ISN 42*
0198        TP=TIME+12.0-((XSN-RADLT)/EN)
0199        K=0
0200        I=IFIX(TP)
0201        N=I
        C
        C           1440 MINUTES IN A DAY
        C
0202        IF(I.GE.0) GO TO 160
0204        I=I+1440
0205        K=-1
0206    160 IF(I.LT.1440) GO TO 161
0208        I=I-1440
0209        K=1
0210    161 L=I-50
0211        IF(L.GE.0) GO TO 162
0213        L=L+1440
0214        K=K-1
0215    162 CONTINUE
        C
        C           PUT TIME OF INJECTION INTO NFIX AND CHANGE JULIAN
        C           DAY NUMBER, IF NEEDED
        C
0216        NFIX(12,8)=NFIX(12,8)+K
0217        K=L/200
0218        NFIX(12,2)=NFIX(12,2)+K
0219        K=K*200
0220        L=L-K
0221        K=L/20
0222        NFIX(12,3)=NFIX(12,3)+K
0223        XTP=FLOAT(I)
0224        TP=XTP
0225        ISECT=40                                          *ISN 44*
        C
        C           CONVERT TP AND OOP TO RCOX3
        C           PACK IN NFIX
        C
0226        INDEX=1
0227        VAL=TP
0228        DO 1 I=1,2
        C
0229        LTP=IFIX(ABS(VAL))
0230        L=LTP/1000
0231        IF(INDEX.EQ.7) GO TO 8
        C
0233        K=3
0234        IF(L.EQ.1) K=7
0236        GO TO 9
        C
0237    8   K=11
0238        IF(VAL.LT.0) K=12
0240    9   CONTINUE
0241        NFIX(INDEX,1)=K
0242        LL=LTP-L*1000
0243        L=LL/100
0244        K=L+3
0245        NFIX(INDEX,2)=K
0246        LL=LL-L*100
0247        L=LL/10
0248        K=L+3
0249        NFIX(INDEX,3)=K
0250        LL=LL-L*10
0251        K=L+3
0252        NFIX(INDEX,4)=K
        C
0253        VALX=ABS(VAL)-FLOAT(LTP)
0254        LXTP=IFIX(VALX*10000.)
0255        L=LXTP/1000
0256        K=L+3
0257        NFIX(INDEX,5)=K
0258        LL=LXTP-L*1000
0259        L=LL/100
0260        K=L+3
0261        NFIX(INDEX,6)=K
0262        LL=LL-L*100
0263        L=LL/10
```

```
0264            K=L+3
0265            NFIX(INDEX,7)=K
0266            L=LL-I+10
0267            K=L+3
0268            NFIX(INDEX,8)=K
0269            NFIX(INDEX,9)=3
0270            VAL=0.0
0271            INDEX=7
0272       1    CONTINUE
0273            ISECT=46                                                        *ISN 46*
C
C               ADD RECEIVER DELAY-COULD DEPEND ON TYPE OF RX AND
C               ITS COMPUTER PROGRAM.
0274            I=ITIME-N
0275            XDELAY=4.5D-5
0276            XDELAY=XDELAY+XD
0277            TEMP=FLOAT(I)-XDELAY
0278            TXJ=TIME
0279            TK=TEMP
C
C
C               FOR 70 DEGREE PASS CUT OFF FIRST
C               2-MIN OF PASS
C
0280            L=0
0281            IF(XEA.EQ.3.) L=-1
C
C               CALCULATE SLANT RANGES AND ELEVATION ANGLES
C
0283            I=0
0284            T=0.0
0285            M=1
0286            TXOMN=0.
0287            XT=0.0
0288            INDEX=-1
0289            XD=2.34D+2
0290            VAL=5878.04060
0291            E1=0.0
0292            OO=DBLE(OO)
0293            A=DBLE(A)
C
C
0294       70   EM=CN*TK
0295            RK=OO-HE*TK
0296            XPK=AC*DCOS(EM)
0297            YPK=AC*DSIN(EM)
0298            YSK=XPK*DCOS(RK)
0299            YSK=XPK*DSIN(RK)
0300            XK=XSK-XNK
0301            YK=YSK-YNK
0302            ZK=YPK-ZNK
0303            SK=DSQRT(XK*XK+YK*YK+ZK*ZK)
0304            F=-1
0305            IF(SK.GT.VAL) GO TO 77
0306            F=1
0307            E1=(XK*XNK+YK*YNK+ZK*ZNK)/(SK*R2)
0309       77   CONTINUE
C
C               TROPOSPHERIC CORRECTION-CHANGE SLANT RANGE AS FUNCTION
C               OF ELEVATION ANGLE
C
0310            E2=(.50171330-6*A)/(E1+.2670-1)
0311            RANGE=SK
C
C               CALCULATE SLANT RANGE IN WAVELENGTHS
C
0312            SK=(RANGE+E2)/EL
0313            ISECT=50                                                        *ISN 50*
C
0314            I=I+1
0315            XN=7.668359820-2
0316            IF(M.LT.2) GO TO 74
C
C               FORM DOPPLER INTERVALS
C
0318            IF(I.EQ.1) XD=2.53D+2
0320            K=M-1
0321            SK1=XFREQ*XD+(SK-SK1)
0322            E1=SK1-XM*XD
0323            E1=(2.*F1)/XD
0324            XM=XM+E1
0325            E1=F1/XD
0326            E1=E1+5.0D+0
0327            SLANT(K)=E1
0328            SK1=SK
0329            XD=2.34D+2
0330       74   IF(I.NE.26) GO TO 76
0332            I=0
0333            TXOMN=TXOMN+2.0
0334            XT=0.
0335            XN=0.
C
C
0336       76   CONTINUE
0337            XT=XT+XN
0338            T=XT+TXOMN
0339            TXJ=TIME+TXOMN
0340            TK=TEMP+T
0341            IF(M.GE.209) GO TO 73
C
C               PASS TO 72 TO CHECK FIRST POSITIVE ELEV. ANGLE
C               **** START OF PASS ****
C
0343            IF(INDEX.LT.0) GO TO 72
C
C               TEST ELEV ANGLE,IF NEGATIVE SLANT RANGE CAL FINISHED
```

```
0346          IF(E.LT.0) GO TO 73
0347          M=M+1
0348          GO TO 70
0349       72 IF(F.LT.0) GO TO 70
0350          IF(I.NE.1) GO TO 70
0351          L=L+1
0352          IF(L.NE.1) GO TO 70
0353          SK1=SK
0354          M=M+1
0355          INDEX=1
C
C              CALCULATE START FREQ IN CYCLES/BIT
C
0359          T=E1
0360          E1=6.0D+1
0361          DR1=XNK*(YPK*DCOS(BK)+EN-WE*YSK)/E1
0362          DR2=YNK*(XE*KSK+EN*YPK*DSIN(BK))/E1
0363          DR3=ZNK*E1*XPK/E1
0364          XK=T*(RANGE/R2)
0365          XK=XK*E2/(RANGE*(T+0.267D-1))
0366          XK=XK+1.0D+0
0367          RANGE=(DR1+DR2-DR3)/RANGE
0368          DRANGE=RANGE*XK
0369          FREQ=XFREQ+((0.1966241080-1*DRANGE)/E1)
C
C              ITP IS TIME OF START OF PASS
C              REQUIRED FOR VARIABLE DATA, NVAR
C
0370          ITP=IFIX(TNJ)
C
0371          XM=FREQ
0372          T=FREQ*6.0D+0
0373          FRQ=T
0374          GO TO 70
C
0375       73 CONTINUE
C
C              CALCULATE VARIABLE PARAMETERS
C              STORE IN NVAR
C
0376          IQMSB=0
0377          IQ=ITP-30
0378       91 IF(IQ.LT.0) GO TO 92
0379          IQ=IQ-30
0380          GO TO 91
0381       92 IQ=(IQ+30)/2
0382          IF(IQ.LE.9) GO TO 93
0383          IQ=IQ-10
0384          IQMSB=4
0385          NVAR(4,1)=NVAR(4,1)+IQMSB
0386       93 NVAR(4,2)=NVAR(4,2)+IQ                         *ISN 58*
0387          ISECT=58
C
0389          IXMSB=IQMSB
0390          IQB=IQ
0391          MM=3
0392          DO 97 MMM=1,3
0393          IQB=IQB-1
0394          IF(IQB.GE.0) GO TO 98
0395          IQB=4
0396          IXMSB=IXMSB+4
0397          IF(IXMSB.EQ.8) GO TO 94
0398          IXMSB=0
0399          IQB=9
0400       94 NVAR(MM,1)=NVAR(MM,1)+IXMSB
0401          NVAR(MM,2)=NVAR(MM,2)+IQB
0402          MM=MM-1
0403       97 CONTINUE                                       *ISN 60*
0404          ISECT=60
C
0408          DO 990 K=5,20
0409          IQ=IQ+1
0410          IF(IQMSB .EQ. 0) GO TO 95
0411          IF(IQ .LE. 4) GO TO 98
0412          IQ=0
0413          GO TO 96
0414       95 IF(IQ .LE. 9) GO TO 98
0415          IQ=IQ-10
0416       96 IQMSB=IQMSB+4
0417          IF(IQMSB.EQ.8) GO TO 98
0418          IQMSB=0
0419       98 NVAR(K,1)=NVAR(K,1)+IQMSB
0420          NVAR(K,2)=NVAR(K,2)+IQ
0425      990 CONTINUE                                       *ISN 62*
0426          ISECT=62
C
C              NOW ENTERING REAL TIME CONTROL
C
C              STOP BUTTON DEPRESSED,ISTOP=1
C              INTERRUPT FLAG,IFLAG=0,NO INTERRUPT
C                                                           00001600
0427          ISTOP=0                                        00001800
0428          IFLAG=0
C
C              INITIALIZE SET-UP PARAMETERS
C              SLP   SLOPE
C              SLP1  LOW ORDER PART OF SLOPE
C              SLP2  HIGH ORDER PART OF SLOPE
C              S1    FEEDBACK INTEGRATOR
C              S2    FEEDBACK INTEGRATOR
C              FRAC  FEEDBACK REMAINDER
C              G     CONVERSION 6(CYCLES/BIT**2) TO HZ/SEC
C              LM    DOPPLER INTERVAL COUNTER
C              LMM   2 MIN COUNTER
C              I     VCO COUNT PER INTERRUPT
C              NCMD  OUTPUT CONTROL WORD
C              BIT 0-5 TUNE COMMAND
```

```
                    C           BIT 6    ENABLE/DISABLE
                    C           BIT 7    UP/DOWN
                    C           BIT 8    TUNE FAST/SLOW
                    C           BIT 9    DATA BIT
                    C           BIT 10   PF ENABLE/DISABLE
                    C
0429                        SLP=0.                                          00003100
0430                        SLP1=0.0
0431                        SLP2=0.0
0432                        S1=0.                                           00002600
0433                        S2=0.                                           00002700
0434                        FRAC=0.                                         00003000
0435                        G=431.0950116                                   00002500
0436                        LM=0                                            00003200
                    C                                                       00002550
0437                        MSTART=0                                        00002300
0438                        INDEX=0                                         00002200
0439                        XC=0.0
0440                        LC=1                                            00002160
0441                        INIT=32767                                      00002150
0442                        IO=0
0443                        L=IFIX(FRQ)
                    C                                                       00003510
                    C                ESTABLISH AN ADDRESS FOR NCMD AND I IN SUBROUTINE SETUP
                    C                ALSO SET UP INTERFACE INTERRUPT VECTOR
                    C
0444                        NCMD=0                                          00003700
0445                        I=0
0446                        CALL SETUP(IFLAG,NCMD,I,ISTOP)
                    C
                    C                ENABLE INTERRUPS VIA ONINT
                    C
0447                        CALL ONINT                                      00004200
                    C                                                       00004300
                    C                SEND VCO TO 13138.4 HZ
                    C                NCMD=383  (256+64+63)
                    C                                                       00004600
0448                        ISECT=60                                        *ISN 64*
0449                   104  NCMD=383
0450                        IFLAG=0                                         00004850
0451                   101  CONTINUE                                        00005000
0452                        IF(IFLAG.EQ.0) GO TO 101                        00005100
0454                        IF(ISTOP.NE.0) GO TO 1111
0456                        IF(I.GT.1550) GO TO 104
                    C
                    C                BRING VCO TO APPROXIMATE START FREQ
                    C                NCMD=511  (256+128+64+63)
                    C
0458                        ISECT=66                                        *ISN 66*
                    C
0459                        K=L-10
0460                        NCMD=511
0461                   201  IF(I.GE.K) GO TO 202
0463                        IFLAG=0                                         00006300
0464                   103  CONTINUE                                        00006500
0465                        IF(IFLAG.EQ.0) GO TO 103                        00006600
0467                        IF(ISTOP.NE.0) GO TO 1111
0468                        GO TO 201                                       00006700
0470                   202  CONTINUE                                        00006800
                    C
                    C                TUNE AT 1 HZ/SEC
                    C                NCMD=193  (128+64+1)
                    C                                                       00007200
0471                        ISECT=68                                        *ISN 68*
0472                   300  NCMD=193
0473                        IFLAG=0                                         00007500
0474                   252  CONTINUE                                        00007600
0475                        IF(IFLAG.EQ.0) GO TO 252                        00007700
0477                        IF(ISTOP.NE.0) GO TO 1111
0479                        K=L-I
0480                        IF(K.GE.0) GO TO 300
                    C
                    C                WITHIN 1 COUNT OF START FREQ
                    C                ENTER FEEDBACK LOOP
                    C                                                       00008400
0482                        ISECT=70                                        *ISN 70*
0483                        GO TO 422                                       00009300
0484                   402  CONTINUE                                        00009400
                    C
                    C                CHECK FOR END OF PASS
                    C
0485                        IF(LM.GT.M) GO TO 1111                          00009700
                    C
                    C                WAIT FOR INTERRUPT
                    C                OUTPUT NCMD
                    C                INPUT I,VCO COUNT
                    C                COUNT NUMBER OF INTERRUPTS,IO
                    C
0487                   407  CONTINUE                                        00009800
0488                        IF(IFLAG.EQ.0) GO TO 407                        00009900
0490                        IF(ISTOP.NE.0) GO TO 1111                       00010300
0492                        ISECT=72                                        *ISN 72*
                    C
                    C                CALCULATE DOPPLER
                    C
0493                   422  CONTINUE
0494                        XE1=(XC+0.5)*SLP1
0495                        XE2=(XC+0.5)*SLP2
0496                        XC=XC+1.0
0497                        XF=FRQ+XE2
                    C                                                       00011200
                    C                E1 IS THE DOPPLER ERROR
                    C                                                       00011400
0498                        EFLOTF=FLOAT(I)
0499                        EX=XF-EFLOTF
0500                        EX=FK*XE1
0501                        XERR=XERR+EX
                    C                                                       00011800
```

```
        C       CALCULATE FEEDBACK
        C
0502            KSLP=SLP
0503            IF(INTT.EQ.1) SLP=SLANT(LC)
0505            D=CON1+FX
0506            S1=D*CON2+S1
0507            S2=S1+CON3+S2
0508            X=D+S1+S2+SLP
0509            X=X+G+FRAC
        C
        C       SET TUNE ENABLE BIT
        C
0510            ISECT=74
0511            NCMD=64
        C
        C       SET TUNE DIRECTION BIT
        C
0512            IF(X.LT.0.) GO TO 110
0514            NT=+1
0515            NCMD=NCMD+128
0516            GO TO 120
0517        110 NT=-1
        C
        C       CALCULATE FRACTION REMAINDER
        C
0518        120 CONTINUE
0519            IF(X.GE.64.0.OR.X.LE.-64.) GO TO 130
0520            NTP=IFIX(ABS(X))
0521            N=NTP
0522            NTP=NTP*NT
0523            FRAC=X-FLOAT(NTP)
0525            ISECT=76
0526            GO TO 140
0527        130 CONTINUE
0528            FRAC=0.0
0529            N=63
        C
        C       SET TUNE BITS
        C
0530        140 NCMD=NCMD+N
0531            IF(NSTART.EQ.0) GO TO 403
        C
        C       CHECKS 2 MINUTE NEW FREQUENCY AND SLOPE
        C       DOPPLER ERROR COUNT IS PRESERVED
        C
0533            IF(MM.EQ.0) GO TO 10
0535            IF(INTT.EQ.0) GO TO 20
0536            GO TO 100
0538         10 IC=1
0539            ISECT=78
0540            MM=-6103
0541            LM=LM+1
0542         20 INTT=234
0543            IF(IC.EQ.26) INTT=253
        C
        C
0545            IC=IC+1
0546            LM=LM+1
0547            SLP=SLANT(LC)
0548            TEMP=8192.0*SLP
0549            IT=IFIX(TEMP)
0550            TEMP=FLOAT(IT)/8192.0
0551            SLP=SLP-TEMP
0552            SLP=TEMP
0553            XC=0.0
0554            IF(LM.LT.2) GO TO 30
0556            FRQ=FRQ+SLANT(LC-1)*T1
0557            SLANT(LC-1)=XEPR/6.
0558         30 CONTINUE
0559            ISECT=80
0560            XERR=0.
0561            T1=FLOAT(INTT)
0562            LC=LC+1
0563        100 CONTINUE
        C
        C       FETCH DATA BIT
        C       NBK   BARKER WORD
        C       NVAR  VARIABLE WORDS
        C       NFIX  FIX WORDS
        C       REPEAT 1100 FOR RANDOM WORDS
        C
0564            IF(MM.NE.-2) GO TO 11
0565            IR=1
0566            NIR=105
0568            LNE=1
0569            NDAT=12
0570            IV=LM+1
0571            L=1
0572         11 IF(IR.LE.NIR) GO TO 41
0574            IF(LNE.LE.8) GO TO 51
0576            IF(LNE.LE.25) GO TO 61
0578            GO TO 71
0579         51 IF(K.NE.0) GO TO 41
0581            ISECT=82
0582            IF(L.EQ.10) GO TO 52
0583            NDAT=IVAR(IV,L)
0584            L=L+1
0585            GO TO 41
0587         52 L=1
0588            IV=IV+1
0589            LNE=LNE+1
0590            IF(LNE.EQ.9) IV=1
0591            IR=1
0592            NIR=194
0593            NDAT=12
```

```
0595           GO TO 41
0596    61  IF(K.NE.0) GO TO 41
0598        IF(L.EQ.10) GO TO 62
0600        ISECT=84
0601        NDAT=NFIX(IV,L)                                        *ISN 84*
0602        L=L+1
0603        GO TO 41
0604    62  L=1
0605        ISECT=86
0606        IV=IV+1                                                *ISN 86*
0607        IR=1
0608        NIR=178
0609        LNE=LNE+1
0610        IF(LNE.EQ.26) NIR=178
0612        NDAT=12
0613        GO TO 41
0614    71  IF(K.NE.0) GO TO 41
0616        NDAT=NRK(L)
0617        L=L+1
0618        IF(K.EQ.0) K=8
0619    41  
0620        ISECT=88
0621        NDAT=512                                               *ISN 88*
0622        MASK=MSKDAT(K)
0623        K=K-1
0624        CALL IAND(NDAT,MASK,KDAT)
0625        ISECT=90
0626        IF(IR.EQ.NIR) K=0                                      *ISN 90*
0628        IR=IR+1
0629        IF(KDAT.NE.0) GO TO 200
0631        NDAT=0
0632   200  CONTINUE                                                   00024700
C
C              SET DATA BIT
0633        NCMD=NCMD+NDAT
C
0634        MM=MM+1                                                    00025700
0635        INTT=INTT-1                                                00025900
0636   403  CONTINUE                                                   00026400
0637        ISECT=92
                                                                       *ISN 92*
C              TURN ON RF                                              00025300
C
0638        NCMD=NCMD+1024                                             00026000
C
C              NCMD IS NOW BUILT, CLEAR INTERRUPT FLAG                 00026700
C
0639        IFLAG=0                                                    00026900
0640        IF(NSTART.GT.0) GO TO 402                                  00027000
                                                                       00027100
C              CHECK COUNT OF INTERRUPTS
1642        IO=IO+1
C
C              WAIT FOR AT LEAST 1 MINUTE AFTER ENABLING R.F.
1643        IF(IO.LT.3000) GO TO 402
C
C              SET 'PASS STARTED' LIGHT
C
1645        ILITE=409A
1646        CALL STATOT(ILITE)
C              INITIALIZE START PARAMETERS
C
C              -------------------------------
C                    PARAMETERS ARE
C              -------------------------------
C
C        NSTART     PASS-STARTED FLAG
C        XERR       ACCUMULATED DOPPLER COUNT ERROR OVER 1 SEGMENT
C        SLP1       FREQUENCY SLOPE COMPONENTS WHICH ADD TOGETHER
C        SLP2       TO GIVE A SLOPE OF 11 SIGNIFICANT DECIMAL DIGS
C        XC         BIT INTERVAL COUNTER FOR MULTIPLYING SLP1 & 2
C        TC         TRACKS SEGMENT NUMBER INTO WHICH 2 MINUTE
C                   INTERVAL IS BROKEN - MAGNAVOX=5
C        MM         2 MINUTE BIT COUNT. RUNS TO 6103
C        INTT       DOPPLER INTERVAL BIT COUNT. EQUALS A VALUE
C                   IN ARRAY KRX
C        NDAT       BIT PATTERN FOR BIT SYNC BY THE RECEIVER (1100)
C                   ALSO USED FOR GARBAGE (NON-RELEVANT) DATA
C        L          INDEXES FOR
C        IV                 NVAR AND NFIX
C        K          BIT INDEX FOR NDAT
C        IR         CURRENT BIT NUMBER ON MESSAGE LINE
C                   THERE ARE 26 LINES OF 234 BITS AND 1 LINE 19
C        NIR        TARGET NUMBER OF BITS ON LINE SEGMENT
C                   IR IS COUNTED UP TO NIR
C        LNE        LINE NUMBER OF SATELLITE MESSAGE, 26 LINES +1
C        LC         INDEX FOR FREQUENCY SLOPE AND ERROR/SEGMENT
C        LM         CURRENT NUMBER OF DOPPLER SEGMENTS - TYPICALLY
C                   LM WILL RUN UP TO 40
C        LMM        CURRENT COUNT OF 2 MINUTE INTERVALS IN PASS
C        S1         FEEDBACK INTEGRATION IN
C        S2                    THIRD ORDER FEEDBACK LOOP
C
1647        NSTART=100                                                 00028500
1648        XERR=0.                                                    00028600
1649        SLP1=0.0
1650        SLP2=0.0
1651        XC=0.0
1652        TC=NINT                                                    00028800
1653        MM=-7236
1654        INTT=8236
1655        NDAT=12
1656        L=1
1657        IV=1
1658        K=0
1659        IR=1
1660        NIR=198
```

```
0661            LNE=0                                                           00029000
0662            LC=1                                                            00029200
0663            LM=0                                                            00029400
0664            LMM=0
0665            S1=0.
0666            S2=0.                                                           00029700
0667            GO TO 402                                                       00029800
       C                                                                        00029900
       C        TERMINATION POINT FOR SUBROUTINE                                00030000
       C        ****************************                                    00030100
0668       1111 CONTINUE                                                        00030200
       C
       C        SEND BOX FREQUENCY TO BOTTOM (13.X KHZ) TO AVOID FOOLING RCVR   00030300
       C                                                                        00030400
0669            NCMD=383
0670            CALL CLRLIT
       C                                                                        00030700
0671        501 IFLAG=0                                                         00030800
0672        502 CONTINUE                                                        00030900
0673            IF(IFLAG.EQ.0) GO TO 502
0675            IF(I.GT.1600) GO TO 501
       C
       C        DISABLE TUNE
       C
0677            NCMD=0                                                          00031200
0678            IFLAG=0                                                         00031300
0679        506 CONTINUE                                                        00031400
0680            IF(IFLAG.EQ.0) GO TO 506                                        00031500
       C
       C        DISABLE INTERRUPTS
       C
0682            CALL CLRINT                                                     00031700
0683            IFLAG=0                                                         00031800
0684            IF(IFLAG.EQ.0) GO TO 5002
0686            IF(LM.LT.2) GO TO 5002
0688            TEM=0.
       C
       C        PROTECT AGAINST STOPPING AFORE ALL 'M' SEGMENTS DONE
       C        CAN GET 'INTEGER OVERFLOW' AND OTHER NASTIES THAT WAY.
       C
       C        ALSO LM IS ALWAYS 1 AHEAD OF THE CURRENT SEGMENT
       C        WE THEREFORE DECREMENT IT BEFORE PRINTING
       C
0689            ISECT=94                                                        *ISN 94*
0690            N=0
0691            LM=LM-1
0692            DO 5001 I=1,LM
0693            N=N+1
0694            TEM=TEM+SLANT(I)
       C
0695            K=IFIX(SLANT(I))
0696            Y=SLANT(I)*100.
0697            X=FLOAT(K)*100.
0698            T=Y-X
0699            L=IFIX(T)
0700            ILANT(I*2-1)=K
0701            ILANT(I*2)=L
0702       5001 CONTINUE
0703            K=IFIX(TEM)
0704            Y=TEM*100.
0705            X=FLOAT(K)
0706            T=Y-X
0707            L=IFIX(T)
0708            ILANT(2*LM+1)=K
0709            ILANT(2*LM+2)=L                                                 *ISN 96*
0710            ISECT=96
0711            IF(N.GT.26) N=1
0712            CALL PRINT(N,ILANT)                                             *ISN 98*
0714            ISECT=98
0715       5002 CALL EXIT
       C
       C
       C
0716            NCMD=0
0717            IFLAG=0
       C
0718            CALL CLRINT
       C
       C        SWITCH ON FAIL LIGHT
       C
0719            CALL FAIL(IFATL)
0720            CALL EXIT
0721            GO TO 3333
0722       2222 CONTINUE                                                        00033400
0723            END
```

```
; 09/19/77 12:02:11  JPD.EXIT3.DATA  1
;
        .TITLE  EXIT3
;
;       SUBROUTINE EXIT                 16-JAN-79 MOD
;
;       CALLED FROM FORTRAN BY
;
;       CALL EXIT
;
;       FLASHES 'READY' LIGHT
;
;       WHEN 'START' BUTTON HIT, SUBPROGRAM COPIES FORTRAN FROM ROM
;       TO R/W MEMORY AND COMMENCES EXECUTING IT.
;
;       IGNORE COLUMNS 73-80
        .ENABL CDR
;
;               START ADDRESS OF R.O.M. = 60000
;
;       INTERNAL GLOBALS
        .GLOBL EXIT, RESTRT, RSTRT1
;
;       EXTERNAL GLOBALS
        .GLOBL EMTSV
;
        .NLIST TTM
        .CSECT
;
        R0 = %0
        R1 = %1
        R2 = %2
        R3 = %3
        R4 = %4
        R5 = %5
        SP = %6
        PC = %7
;
        OFFSET = 60000                  ;START ADDRESS OF ROM
;
EXIT:
        BIC     #32000,@#167762         ;ZERO STATUS LIGHTS (EXCEPT FAIL)
        JMP     RESTRT+OFFSET
;
;
;               POWER INITIALISATION ROUTINE
;
;               WHEN SATNAV BOX IS SWITCHED ON, THE LSI-11 IS WIRED
;               TO JUMP TO ADDRESS 173000 AND BEGIN EXECUTING.
;
;               ADDRESS 173000 CONTAINS  "JMP   #40400".
;               ADDRESS 173000 SHOULD CONTAIN "JMP #60400" FOR 12K
;
;               ADDRESS 60400 CONTAINS ADDRESS OF 'PWRUP' IN ROM
;
;               THUS PWRUP IS THE FIRST ENTRY POINT OF THE PROGRAM
;               PROPER WHEN BOX IS SWITCHED ON.
;
PWRUP:
        MOV     #140.,SP                ;FOR STACK POINTER
;
;       SET ALL LIGHTS ON AS A TEST
;
;       START 3 SECOND COUNT DOWN
;
        MOV     #1000.,R0
PWRUP1: MOV     #779.,R1
        DEC     R1
        BGT     .-2
        DEC     R0
        BGT     PWRUP1
;
;
        BIC     #50,@#167766            ;KILL TWO TOP ERROR CODE LIGHTS
        MOV     #100000,R0              ;R0 ACTS AS 'SWEEPER'
        MOV     #177777,R3              ;R3 IS SWEEPER COMPARATOR
        MOV     #167764,R2              ;R2 POINTS TO TARGET REGISTER
;
LITOFF:
        MOV     #8000.,R1               ;R1 IS 'TIMER' FOR FADING
        DEC     R1
        BGT     .-2
        BIC     R0,(2)                  ;ZERO A LIGHT
        CMP     R0,R3                   ;HAVE WE FINISHED SWEEPING?
        BEQ     LTOFF1
        ASR     R0
        BR      LITOFF
LTOFF1: CMP     R2,#167762
        BEQ     READY                   ;FINISHED ALL FADING
        MOV     #140000,R0
        MOV     #176000,R3
        MOV     #167762,R2              ;STATUS LIGHTS
        BR      LITOFF
;
;
READY:  RESET
;
RESTRT:                                 ;ENTRY POINT AFTER A PASS IS OVER
        MOV     #4000,R1                ;READY LIGHT
        BIC     #20,@#167766            ;CLEAR START FLIP-FLOP
RSTRT1:
        MOV     #32767.,R0              ;TIMER LOOP FOR FLASHING 'READY'
        DEC     R0                      ;4,2 MICROSECONDS
        INC     R0                      ;4,2 MICROSECONDS
        DEC     R0                      ;4,2 MICROSECONDS
        BGT     .-6                     ;3,5 MICROSECONDS
        XOR     R1,@#167762             ;CHANGE POLARITY OF FLASHING LITE
        BIT     #20,@#167766            ;'START' HIT?
        BEQ     RSTRT1
```

```
;                                                                        00010500
;                                                                        00010600
        RESET                           ;SET ALL STATES TO ZERO           00010700
        CLR     R3                                                        00010800
        MTPS    R3                      ;SET PROCESSOR PRIORITY TO 0      00010900
        BIS     #20,@#167766            ;RE-ESTABLISH START FLIP-FLOP     00011000
;                                                                        00011100
;               TEST FOR PRESENCE OF KEYBOARD                             00011200
;                                                                        00011300
        MOV     #OFFSET+NOKBD,@#4       ;SET UP NON-EXIST ADDRESS TRAP    00011400
        CLR     @#6                     ;STATUS OF CPU IF IT TRAPS TO 4   00011500
        TST     @#177560                ;YOO-HOO, KEYBOARD,               00011600
        BR      COPY                    ;KEYBOARD'S THERE, CHARGE AHEAD,  00011700
NOKBD:                                                                    00011800
        INC     R3                      ;R3=1 MEANS NO KEYBOARD,          00011900
COPY:                                                                    00012000
        MOV     #OFFSET,R1              ;TOP OF ROM
        ADD     R0,R1
        MOV     R0,SP                   ;SET UP STACK POINTER             00012300
COPYLP: CLR     -(0)                                                      00012400
        MOV     -(1),(0)                                                  00012500
        TST     R0                      ;COPIED TO LOC 0 YET?             00012600
        BGT     COPYLP                                                    00012700
        MOV     #OFFSET,R0
        MOV     #OFFSET,R1
        ADD     R0,R1
CHKLP:                                  ;CHECK LOOP                       00012730
        CMP     -(1),-(0)                                                 00012740
        BNE     RPTCHK                                                    00012750
        TST     R0                                                        00012760
        BGT     CHKLP                                                     00012770
        TST     R3                      ;KEYBOARD PRESENT?                00012800
        BEQ     CPYJMP                  ;IF SO, DON'T FUDGE TRAP HANDLERS 00012900
;                               IF NOT ...                                00013000
;                       SWITCH IN OUR OWN EMT HANDLER                     00013100
        MOV     @#30,@#EMTSV                                              00013200
        MOV     #EMTSV+2,@#30                                             00013300
CPYJMP: JMP     @#2                                                       00013400
;                                                                        00013410
;                                                                        00013420
RPTCHK: INC     R2                      ;REPEAT CHECK                     00013430
        CMP     R2,#32.                 ;ALLOW 12 SECONDS FOR REPEATS     00013440
        BGE     ERRDSP                                                    00013450
        BR      CPYRPT                  ;TRY AGAIN                        00013460
ERRDSP: MOV     #40000,@#167762         ;ERROR DISPLAY - FAIL LIGHT       00013470
        MOV     #4621,@#167760          ;BCD_991                          00013480
        JMP     RESTRT                  ;GO & FLASH READY LIGHT           00013490
;                                                                        00013500
;               DUMMY PASSALONG FOR SUBROUTINE TEST                       00013600
;                                                                        00013700
        .GLOBL  TEST                                                      00013800
;                                                                        00013900
TEST:                                                                    00014000
        RTS     PC                                                        00014100
;                                                                        00014200
        .ASECT                                                            00014300
        .=0                                                               00014400
        .BLKB   400                                                       00014500
        .WORD   PWRUP+OFFSET                                              00014600
        .END                                                              00014700
```

```
PL  RT-11 MACRO VM02-12                              PAGE 1

.TITLE  USRIPL
                ;
                ;       PROGRAMMED BY J. P. DUNCAN
                ;                 CHEVRON OIL  LA HABRA CALIFORNIA
                ;
                ;       ********************
                ;          VERSION  02
                ;       ********************
                ;       DATE OF CURRENT VERSION
 11             ;                               .NLIST  TTM
 12             ;
 13             ;               USER INITIATION OF RT-11 STAND ALONE FORTRAN
 14             ;
 15             ;
 16             ;               DETECTS WHETHER A TELETYPE IS PRESENT AND IF NOT, REROUTES
 17             ;               EMT VECTOR (LOCATION 30) AND TRAP VECTOR (LOCATION 34)
 18             ;               TO SOFTWARE WITHIN USRIPL.
 19             ;
 20             ;               IF NO TELETYPE IS PRESENT, TRAP HANDLERS FLASH ERROR MESSAGE
 21             ;               NUMBER ON FRONT PANEL LIGHTS IN BCD (IE 4 BIT BLOCKS)
 22             ;
 23             ;
 24             ;               ALSO KEEPS TRACK OF SECTION NUMBERS IN FORTRAN PROGRAM
 25             ;
 26             ;
 27             ;               CALL SEQUENCE IS:
 28             ;               TTFLAG=0
 29             ;               ISECT=0
 30             ;               CALL USRIPL(TTFLAG,ISECT)
 31             ;
 32             ;               THIS SHOULD BE THE FIRST STATEMENT OF THE FORTRAN "MAIN" PGM
 33             ;
 34             ;
 35             ;               INTERNAL GLOBALS
 36             ;               .GLOBL  USRIPL,EMTSV
 37             ;               EXTERNAL GLOBALS
 38             ;               .GLOBL  RSTRT1
 39             ;
 40     000000'                 .CSECT
 41     000000                  R0 = %0
 42     000001                  R1 = %1
 43     000002                  R2 = %2
 44     000003                  R3 = %3
 45     000004                  R4 = %4
 46     000005                  R5 = %5
 47     000006                  SP = %6
 48     000007                  PC = %7
 49 000000                USRIPL:
 50             ;
 51             ;       SET "RUN" LIGHT TO INDICATE GOOD COPY
 52             ;
 53 000000  052737  020000  167762    BIS    #20000,@#167762
 54 000006  012767  000552' 000100'   MOV    #BADINT,100        ;FIELD INTERRUPTS TO 100
 55 000014  012767  000200  000102'   MOV    #200,102
 56 000022  012767  000562' 000024'   MOV    #PRFAIL,24
 57 000030  012767  000200  000026'   MOV    #200,26
 58 000036  016567  000004  000504'   MOV    4(5),SECTAD        ;ADDRESS OF 'ISECT'
 59 000044  016767  000004' 000104'   MOV    4,FOURSV           ;SAVE SYSTEM VECTOR IN LOC 4
 60 000052  012767  000102' 000004'   MOV    #TTNOT,4           ;SET OUR OWN VECTOR IN 4
 61 000060  013700  177560            MOV    @#177560,R0        ;SEE IF THERE'S A TTY THERE
 62 000064  016767  000066' 000004'   MOV    FOURSV,4           ;IF WE GET HERE, THERE IS ONE)
 63 000072  012775  000001  000002    MOV    #1,@2(5)           ;PUT A "1" IN TTFLAG
 64 000100  000207                    RTS    %7                 ;EXIT NORMALLY
 65
 66
 67 000102                TTNOT:
 68 000102  016767  000050' 000004'   MOV    FOURSV,4           ;THERE'S NO TELETYPE)
 69 000110  013767  000034  000042'   MOV    @#34,TRAPSV        ;RESTORE SYSTEM VECTOR TO 4
 70 000116  012737  000530' 000034    MOV    #TRPPCC,@#34       ;SAVE SYSTEM 'TRAP' VECTOR
 71 000124  023727  000030  000164'   CMP    @#30,#EMTEMT       ;AND SWITCH IN OUR OWN
 72 000132  001406                    BEQ    TTNOT1             ;SEE IF WE HAVE SUBSTITUTED EMT
 73 000134  013767  000030  000020'   MOV    @#30,EMTSV         ;IF SO, DON'T CHANGE LOCATION 30
 74 000142  012737  000164' 000030    MOV    #EMTEMT,@#30       ;SAVE SYSTEM 'EMT' VECTOR
 75 000150                TTNOT1:                               ;MOVE IN EMT EMULATE
 76 000150  062706  000004            ADD    #4,SP              ;CORRECT STACK FOR TRAP TO 4
 77 000154  000207                    RTS    %7                 ;DO A RETURN FROM USRIPL
 78
 79             ;
 80 000156  000000            FOURSV: 0
 81 000160  000000            TRAPSV: 0
 82 000162  000000            EMTSV:  0
 83
 84             ;
 85             ;               WE MUST PERFORCE INTERCEPT SOME EMT CALLS
 86             ;
 87             ;               IF WE HAVE CONFIRMED THAT THERE'S NO TTY OUT THERE
 88             ;               WE MUST NIP EMT CALLS WHICH PRINT IN THE BUD
 89 000164                EMTEMT:
 90 000164  010046                    MOV    R0,-(SP)           ;SAVE R0
 91 000166  016600  000002            MOV    2(SP),R0           ;INSTR AFTER EMT
 92 000172  014000                    MOV    -(R0),R0           ;EMT INSTRUCTION IN R0
 93 000174  042700  104000            BIC    #EMT,R0            ;STRIP OFF 104XXX
 94
 95             ;               WE WANT TO INTERCEPT   341 - TTOUTR    PRINT CHAR IN R0
 96             ;                                      340 - TTYIN     READ A CHAR INTO R0
 97             ;                                      342 - DSTATS    DEVICE STATUS (FOR KBD)
 98             ;                                      351 - PRINT     STRING POINTED TO BY R5
 99             ;                                      350 - STOP      PRINT "**** STOP"
100             ;                                      354 - SETTOP    BUT ENABLES KBD INTR
101
102
103 000200  022700  000340            CMP    #340,R0
104 000204  001433                    BEQ    ERRSIG
105 000206  022700  000341            CMP    #341,R0
```

```
106 C00212  001430                              BEQ       ERRSIG
107 C00214  022700   000351                     CMP       #351,R0
108 C00220  001425                              BEQ       ERRSIG
109 C00222  022700   000342                     CMP       #342,R0
110 C00226  001422                              BEQ       ERRSIG
111 C00230  022700   000350                     CMP       #350,R0
112 C00234  001417                              BEQ       ERRSIG
113 C00236  022700   000354                     CMP       #354,R0
114 C00242  001403                              BEQ       TOPSET          ;THIS IS SETTOP
115 C00244  012600                              MOV       (SP)+,R0        ;IF IT'S NONE OF THESE, RESTORE R0
116 C00246  000177   177710                     JMP       @EMTSV          ; AND GO TO EMT HANDLER IN SYSTEM
117
118                                     ;
119 C00252                              TOPSET:                           ;SUBSTITUTES FOR SETTOP
120 C00252  012600                              MOV       (SP)+,R0        ;FIRST, RESTORE R0
121 C00254  010037   000050                     MOV       R0,@#50         ;SET SETTOP ADDRESS FOR CTI
122 C00260  042767   000001   000002            BIC       #1,2(SP)        ;CLEAR CALLER'S CARRY
123 C00266  000002                              RTI                       ;GO BACK AND CONTINUE
124
125                                     ;
126                                     ;       ERRSIG    DISPLAYS ERROR CODE IN LIGHTS
127                                     ;                 WHILE CODE IS FIXED 'FAIL' LIGHT FLASHES
128                                     ;
129                                     ;                 IT SHOULD LOOK LIKE SOMETHING FROM STAR TREK
130                                     ;
131                                     ;       ERROR CODE IS PASSED IN R0
132                                     ;
133                                     ;       WHEN OPERATOR HAS WRITTEN ERROR CODE DOWN TO HELP US
134                                     ;       DIAGNOSE IT, HE CAN PRESS 'START' AND RESTART THE ENTIRE
135                                     ;       SEQUENCE STARTING WITH THE ROM COPY PROGRAM
136
137                                     ;
138 C00270  000000                      ILITE:  0                         ; HOLDS ERROR CODE WHICH IS PUT
139 C00272  000000                      ILITE1: 0                         ; IN LIGHTS
140
141                                     ;
142                                     ;       ERROR LIGHT DISPLAY IS
143                                     ;
144                                     ;       ------ ------ ------ ------ ------
145                                     ;       | 0C | 0000 | 0000 | 0000 | C000 |
146                                     ;       ------ ------ ------ ------ ------
147                                     ;
148                                     ;       <- - -ERROR CODE - - -> <- - -SECTION - - >
149                                     ;
150
151 C00274                              ERRSIG:
152                                             .ENABL    LSB             ;LOCAL SYMBOL BLOCK
153 C00274  052737   040000   167762            BIS       #40000,@#167762 ;SET 'FAIL' LIGHT
154 C00302  005067   177762                     CLR       ILITE
155 C00306  005067   177760                     CLR       ILITE1
156 C00312  010001                              MOV       R0,R1           ;SET UP FOR DIVIDE
157 C00314  001432                              BEQ       7$
158 C00316  005000                              CLR       R0
159 C00320  071027   000144                     DIV       #100.,R0        ;INTEGER RESULT-> R0
160 C00324  032700   000001                     BIT       #1,R0
161 C00330  001403                              BEQ       1$
162 C00332  062767   000010   177732            ADD       #10,ILITE1      ;A '1' BIT IS BIT 3
163 C00340  032700   000002                1$:  BIT       #2,R0
164 C00344  001403                              BEQ       2$
165 C00346  062767   000040   177716            ADD       #40,ILITE1      ; AND A '2' BIT IS BIT 5, NATCH
166 C00354  005000                       2$:    CLR       R0
167 C00356  071027   000012                     DIV       #10.,R0
168 C00362  072027   000014                     ASH       #12.,R0
169 C00366  010067   177676                     MOV       R0,ILITE
170 C00372  072127   000010                     ASH       #8.,R1
171 C00376  060167   177666                     ADD       R1,ILITE
172
173                                     ;       DIG OUT SECTOR NUMBER FOR TRACEBACK
174
175 C00402  017701   000142                7$:  MOV       @SECTAD,R1
176 C00406  005000                              CLR       R0              ;SET UP FOR DIVIDE AGAIN
177 C00410  071027   000012                     DIV       #10.,R0
178 C00414  072027   000004                     ASH       #4,R0
179 C00420  060067   177644                     ADD       R0,ILITE
180 C00424  060167   177640                     ADD       R1,ILITE
181 C00430  016737   177634   167764            MOV       ILITE,@#167764  ;SEND ERROR CODE TO LIGHTS
182 C00436  056737   177630   167766            BIS       ILITE1,@#167766 ;BITS 16 AND 17
183 C00444  012700   000024                     MOV       #20.,R0         ;COUNT 10 SECONDS
184 C00450  012701   044000                     MOV       #44000,R1       ;SET UP FOR EXCLUSIVE OR
185 C00454  012767   056370   177474       6$:  MOV       #23800.,FOURSV  ;COUNT OUT 0.5 SECOND
186 C00462  005367   177470            5$:     DEC       FOURSV          ;2.65+3.46 MICRO SEC
187 C00466  005267   177464                    INC       FOURSV          ;2.65+3.46 MICRO SEC
188 C00472  005367   177460                    DEC       FOURSV          ;2.65+3.46 MICRO SEC
189 C00476  002371                             BGE       5$              ;2.65 MICRO SEC
190
191                                     ;       DON'T CLEAR OUT 'START' FLOP UNTIL 4 SECONDS HAVE ELAPSED
192                                     ;
193 C00500  020027   000015                    CMP       R0,#13.
194 C00504  003005                             BGT       4$
195 C00506  042737   000020   167766           BIC       #20,@#167766    ;SET START FLOP TO STOP
196 C00514  000137   040000                    JMP       @#40000+RSTRT1
197 C00520                              4$:
198 C00520  005300                             DEC       R0
199 C00522                              3$:
200 C00522  074137   167762                    XOR       R1,@#167762     ;CHANGE POLARITY OF 'FAIL'
201 C00526  000752                             BR        6$
202
203                                            .DSABL    LSB             ;DISABLE LOCAL SYMBOL BLOCK
204
205                                     ;
206                                     ;
207 C00530                              TRPROC:                          ;TRAP PROCESSOR
208 C00530  010046                              MOV       R0,-(SP)        ;SAVE R0
209 C00532  016600   000002                     MOV       2(SP),R0        ;PC OF INSTRUCTION AFTER 'TRAP'
210 C00536  014000                              MOV       -(R0),R0        ;'TRAP' INSTRUCTION IN R0
211 C00540  162700   104700                     SUB       #TRAP+300,R0    ;ELIMINATE UNNEEDED BITS
212 C00544  000167   177524                     JMP       ERRSIG
213                                     ;
```

```
214
215 C0C550  000000                    SECTAD: 0                              ;ADDRESS OF 'ISECT'
216                                   ;
217                                   ;
218 C00552                            BACINT:
219 C00552  01270C  0C0425                    MOV     #277.,R0
220 C00556  000167  177512                    JMP     ERPSIG
221                                   ;
222 C00562                            PRFAIL:
223 C00562. 01270C  000467                    MOV     #311.,R0
224 C00566  000167  177502                    JMP     ERPSIG
225          000001*                          .END
```

DATAIN                              RT-11 MACRO VM02-12

```
  1                                 ; <     CS:57:15  JPD.DATAIN.DATA  1
  2                                 ;               .TITLE   DATAIN                            000C0100
  3                                 ;
  4                                 ;       PROGRAMMED
  5                                 ;               CHEVRON OIL  LA HABRA  CALIFORNIA
  6                                 ;
  7                                 ;       DATE OF CURRENT VERSION
  8                                 ;                                                           00000200
  9                                 ;       INPUTS SATNAV PARAMETERS FROM FRONT PANEL OR KEYBOARD   0000300
 10                                 ;                                                           000C0400
 11                                 ;       EMULATES SUBROUTINE(IA,IVAR(N),IVAR(N-1),...IVAR(1))    000C0650
 12                                 ;                                                           000C0650
 13                                 ;       IA IS USED FOR FORMAT CONTROL                       00000700
 14                                 ;                                                           000C0800
 15                                 ;       IA              INPUT CALL                          00CC0900
 16                                 ;       --              ----------                          000C1000
 17                                 ;                                                           00CC1100
 18                                 ;       0       CALL DATAIN(IA,TTFLAG)     CALL TO ESTABLISH KEYBOARD  000C1250
 19                                 ;       1       CALL DATAIN(IA,NRX)                         000C1300
 20                                 ;       2       CALL DATAIN(IA,IAN(3),IAN(2),IAN(1),NAN)    00CC1400
 21                                 ;       3       CALL DATAIN(IA,ILT(4),ILT(3),ILT(2),ILT(1)) 00001500
 22                                 ;       4       CALL DATAIN(IA,ILT(7),ILT(6),ILT(5))        00001600
 23                                 ;       5       CALL DATAIN(IA,NLT)                         0CCC1700
 24                                 ;       6       CALL DATAIN(IA,ILG(1))     DEGREES LONGITUDE X 100  00001800
 25                                 ;       7       CALL DATAIN(IA,ILG(5),ILG(4),ILG(3),ILG(2)) 000C1900
 26                                 ;       8       CALL DATAIN(IA,ILG(8),ILG(7),ILG(6))        000C2000
 27                                 ;       8       CALL DATAIN(IA,NLG)                         000C2100
 28                                 ;       10      CALL DATAIN(IA,ITM(4),ITM(3),ITM(2),ITM(1)) 0CCC2200
 29                                 ;       11      CALL DATAIN(IA,NRX)        RE-INPUT NRX AFTER 'START'  00002250
 30                                 ;                                                           00002300
 31                                 ;                                                           00CC2400
 32                                 ;
 33                                 ;       .ENABL  CDR
 34              000000                     R0 = %0
 35              000001                     R1 = %1
 36              000002                     R2 = %2
 37              000003                     R3 = %3
 38              000004                     R4 = %4
 39              000005                     R5 = %5
 40              000006                     SP = %6
 41              000007                     PC = %7
 42                                 ;
 43                                 ;
 44                                 ;
 45                                         .GLOBL  DATAIN                                      000C8500
 46              000000*                    .CSECT                                              000C8600
 47 C00000  000000                  TTFLAG: 0                                                   000C8700
 48 C00002                          DATAIN:                                                     000C8750
                                                                                                000C8800
 49 C00002  027527  CC0002  00CC13          CMP     @2(5),#11.      ;RE-INPUT OF NRX?           000C8805
 50 C00010  001030                          BNE     TST1D                                       00008810
 51 C00012  012700  000050                  MOV     #50,R0          ;GET READY TO FLASH (LIGHTS!)  00008820
 52 C00016  050037  167766                  BIS     R0,@#167766     ;SWITCH ON LIGHTS           000C8825
 53 C00022  042737  000020  167766          BIC     #20,@#167766    ;CLEAR 'START' BIT          00008830
 54 C00030  012701  077777          TST1A:  MOV     #32767.,R1      ;START TIMING FOR FLASHES   00008835
 55 C00034  032737  CC0020  167766  TST1B:  BIT     #20,@#167766    ;'START' HIT?               000C8840
 56 C00042  001005                          BNE     TST1C                                       00008845
 57 C0C044  005301                          DEC     R1                                          000C8850
 58 C00046  003372                          BGT     TST1B                                       00008855
 59 C00050  074037  167766                  XOR     R0,@#167766     ;SWITCH POLARITY OF LIGHTS  00008860
 60 C00054  000765.                         BR      TST1A                                       00008865
 61 C00056  162775  000012  00C002  TST1C:  SUB     #10.,@2(5)      ;11 -> 1 FOR NRX            00008870
 62 C00064  042737  000050  167766          BIC     #50,@#167766    ;CLEAR LIGHTS 16 AND 17     00088073
 63
 64                                 ;
 65 C0C072                          TST1D:
 66 000072  005775  000002                  TST     @2(5)           ;IA=0?                      00008880
 67 C00076  001003                          BNE     DATIN
 68 C00100  005067  177674                  CLR     TTFLAG          ;WE WANT TO USE PANEL FOR INPUT
 69 C00104  000207                          RTS     %7
 70                                                                                             000C9000
 71                                 ;                                                           00009400
 72 C00106  005767  177666          DATIN:  TST     TTFLAG          ;ARE WE USING KBD?
 73 C00112  001405                          BEQ     INPANL
 74                                                                 ;SHOULD NEVER GET HERE.
 75 C0C114  005737  157001                  TST     @#157001        ;FORCE FORTRAN TO TRAP
 76 C00120  000177  040400*                 JMP     @40400
 77
 78                                 ;
 79                                                                                             00013400
 80                                 ;                                                           00013500
 81 C00124  C00000                  TRAPSV: 0                                                   00013600
                                                                                                00013900
 82                                 ;                                                           00014200
 83                                         .EVEN                                               00014300
 84                                                                                             00014400
 85                                 ;
 86 C00126                          INPANL:                                                     00014500
 87 C00126  01750C  000002                  MOV     @2(5),%4        ;PICK UP SELECT CODE        00014700
 88 000132  006304                          ASL     %4              ;CONVERT TO A BYTE INDEX    00014800
```

```
 89 C00134  042737  000007  167766          BIC     #7,@#167766       ;CLEAR PREVIOUS SELECT CODE    00014850
 90 C00142  056467  CC0254* 167766*         BIS     SLTCO0(4),167766                                 00014905
 91 C00150  016701  167776*                 MOV     167776,%1         ;STORE READBACK IN R1          00015000
 92 000154  000174  000302*                 JMP     @RDPTR(4)                                        00015100
 93                                     ;                                                            00015200
 94                                                                                                  00015300
 95 C00160  072127  177774          NRXIN:  ASH     #-4,%1            ;SHIFT DATA RIGHT 4 PLACES     00015400
 96 C00164  046701  000062          LONHUN: BIC     MSK1,%1           ;FOR LONGITUDE X 100           00015500
 97 C00170  010175  000004                  MOV     %1,@4(5)          ;STORE IN ARGUMENT             00015600
 98 C00174  000207                          RTS     %7                                               00015700
 99                                                                                                  00015800
100                                     ;                                                            00015900
101 000176  012775  C00001  000012  ANTIN:  MOV     #1,@10.(5)        ;PLUS 1 IN ARGUMENT            00016000
102 C00204  032701  000001                  BIT     #1,%1             ;WAS BIT ZERO SET              00016100
103 C00210  0014C2                          BEC     .+6                                              00016200
104 C00212  005475  000012                  NEG     @10.(5)                                          00016300
105 C00216  000451                          BR      PT3                                              00016400
106                                                                                                  00016500
107                                     ;                                                            00016600
108 C00220  012775  000001  000004  LATPOL: MOV     #1,@4(5)          ;LATITUDE POLARITY             00016730
109 C00226  000403                          BR      POLTST                                           00016740
110 000230  012775  177777  0C0C04  LONPCL: MOV     #-1,@4(5)                                        00016850
111 C00236                          PCLTST:                           ;TO TEST FOR CROSS-EYED HARDWARE 00016850
112 C00236  032701  C00001                  BIT     #1,%1             ;WAS BIT ZERO SET?             00016900
113 C00242  001402                          BEQ     .+6                                              00017000
114 C0C244  005475  CC0004                  NEG     @4(5)                                            00017100
115 C00250  000207                          RTS     %7                                               00017200
116                                                                                                  00017300
117                                     ;                                                            00017400
118 000252  177760                  MSK1:   177760                    ;MASKS OFF BITS 4-15           00017500
119                                                                                                  00017600
120 C00254  000000                  SLTCC0: 0                         ;1                             00017700
121 C00256  000000                          0                         ;2                             00017850
122 C00260  000005                          5                         ;3                             00017900
123 C00262  000003                          3                         ;4                             0C018000
124 C00264  000004                          4                         ;5                             00018100
125 C00266  000004                          4                         ;6                             00018200
126 C00270  000000                          0                         ;7                             00018300
127 C00272  000001                          1                         ;8                             00018400
128 C00274  000002                          2                         ;9                             00018500
129 C00276  000002                          2                         ;10                            00018600
130 C00300  000006                          6                                                        00018700
131                                     ;                                                            00018800
132 C00302  000000                  RDPTR:  0                         ;1                             00018900
133 C00304  000160*                         NRXIN                     ;2                             00019000
134 C00306  000176*                         ANTIN                     ;3                             00019100
135 C0C310  000330*                         PT4                       ;4                             00019200
136 C00312  000342*                         PT3                       ;5                             00019300
137 C00314  000220*                         LATPOL                    ;6                             00019400
138 C00316  000164*                         LONHUN                    ;7                             00019500
139 C00320  000330*                         PT4                       ;8                             0C019600
140 C00322  000342*                         PT3                       ;9                             00019700
141 C00324  00C230*                         LONPOL                    ;10                            00019800
142 C00326  000330*                         PT4                                                      00019900
143                                     ;                                                            00020000
144                                     ;                                                            00020100
145 C00330  005000                  PT4:    CLR     %0                                               00020200
146 C00332  073027  000004                  ASHC    #4,%0                                            00020300
147 C00336  010075  000012                  MOV     %0,@10.(5)                                       0C020400
148 000342  005000                  PT3:    CLR     %0                                               00020500
149 C00344  073027  C00004                  ASHC    #4,%0                                            0C020600
150 C00350  010075  0C0010                  MOV     %0,@8.(5)                                        00020700
151 C00354  005000                  PT2:    CLR     %0                                               00020800
152 C00356  073027  C00004                  ASHC    #4,%0                                            00020900
153 C00362  010075  000006                  MOV     %0,@6(5)                                         00021000
154 C00366  005000                  PT1:    CLR     %0                                               00021100
155 C00370  073027  CC0004                  ASHC    #4,%0                                            0C021200
156 000374  010075  C00004                  MOV     %0,@4(5)                                         00021300
157 C0C400  000207                          RTS     %7                                               00021400
158                                     ;                                                            00021500
159                                         .EVEN                                                    00025700
160                                                                                                  00033800
161                                     ;                                                            00035800
162         000001*                         .END                                                     00035900
```

```
UTILIT
TABLE OF CONTENTS 1- 20  CLRINT    CLEAR RF, INT ENABLE
    1- 35  ONINT     ENABLE INTERRUPT
    1- 46  LAND      LOGICAL 'AND'
    1- 65  LITON     SETS PANEL LIGHTS
    1- 76  LITOFF    KILLS PANEL LIGHTS
    1- 87  SETUP     SETS UP INT SERVICE SUB
    1-134  STATOT    SETS BITS IN STATUS REGISTER
    1-145  FAIL      SETS 'FAIL' CODE IN LIGHTS
    1-196  DELAY     HOLDS DELAY FOR RECEIVERS
```

```
UTILIT                      RT-11 MACRO VM02-12

1           ;         08:23:16   JPD.UTILIT.DATA  1
    2           .TITLE UTILIT                                          00000100
    3                                                                  00000200
    4           ;         ASSEMBLY LANGUAGE PROGRAMS TO INTERFACE      00000300
    5           ;         WITH            INTERFACE                    00000400
    6           ;                                                      00000500
    7           ;                                                      00000600
    8
    9                                                                  00000700
   10
   11                                                                  00000800
   12           ;         THESE PROGRAMS ALL ACT AS THOUGH THEY WERE FORTRAN SUBROUTINES  00000900
   13                                                                  00001000
```

```
 15                              .ENABL COR
 16                                                .NLIST  TTM                                                      00001100
 17              000000'                           .CSECT                                                           00001300
 18                              ;                                                                                  00001400
 19                              ;                                                                                  00001500
 20                              ;               .SBTTL  CLRINT     CLEAR RF, INT ENABLE                            00001601
 21                              ;                                                                                  00001700
 22                              ;       CALL CLRINT                                                                00001800
 23                              ;                                                                                  00001900
 24                              ;       CALL CLRLIT                                                                00002000
 25                              ;                                                                                  00002100
 26                                                .GLOBL  CLRINT, CLRLIT                                           00002200
 27  C00000                     CLRINT:                                                                             00002300
 28  C00000  042737  102100  167762                 BIC    #102100,@#167762   ;CLEAR INT, PF, TUNE ENABLES          00002400
 29  C00006                     CLRLIT:                                                                             00002500
 30  C00006  042737  010000  167762                 BIC    #10000,@#167762    ;CLEAR 'PASS STARTED'.                00002620
 31  C00014  000207                                 RTS    %7                                                       00002700
 32                              ;                                                                                  00002800
 33                              ; -.-.-.-.-.-.-.-.-.-.-.-.-.-.-.-.-.-.-                                            00002900
 34                              ;                                                                                  00003000
 35                              ;               .SBTTL  ONINT      ENABLE INTERRUPT                                00003101
 36                              ;                                                                                  00003200
 37                              ;       CALL ONINT                                                                 00003300
 38                              ;                                                                                  00003400
 39                                                .GLOBL  ONINT                                                    00003500
 40  C00016                     ONINT:                                                                              00003600
 41  C00016  052737  100000  167762                 BIS    #100000,@#167762   ;ENABLE 19.662 MS INTERRUPT           00003700
 42  C00024  000207                                 RTS    %7                                                       00003800
 43                              ;                                                                                  00003900
 44                              ; -.-.-.-.-.-.-.-.-.-.-.-.-.-.-.-.-.-.-                                            00004000
 45                              ;                                                                                  00004100
 46                              ;               .SBTTL  LAND       LOGICAL 'AND'                                   00004201
 47                              ;                                                                                  00004300
 48                              ;       CALL LAND(IA,IB,IC)                                                        00004400
 49                              ;                                                                                  00004500
 50                                                .GLOBL  LAND                                                     00004600
 51  C00026                     LAND:                                                                               00004700
 52  C00026  005725                                 TST    (%5)+                ;POINT TO IA                        00004800
 53  C00030  013501                                 MOV    @(%5)+,%1            ;IA -> P1                           00004900
 54  C00032  013502                                 MOV    @(%5)+,%2            ;IB -> P2                           00005000
 55  C00034  005101                                 COM    %1                   ;ONE'S COMP. IE A-NOT               00005100
 56  C00036  005102                                 COM    %2                   ;B-NOT                              00005200
 57  C00040  050102                                 BIS    %1,%2                ;A-NOT.OR.B-NOT                     00005300

LOGICAL 'AND'

58  C00042  005102                                 COM    %2                   ;NOT(A-NOT.OR.B-NOT)                00005400
 59                              ;                                              ; IE A.AND.B                        00005500
 60  C00044  010235                                 MOV    %2,@(%5)+            ;STORE RESULT IN IC                 00005600
 61  C00046  000207                                 RTS    %7                                                       00005700
 62                              ;                                                                                  00005800
 63                              ;                                                                                  00005900
 64                              ; -.-.-.-.-.-.-.-.-.-.-.-.-.-.-.-.-.-.-                                            00006000
 65                              ;                                                                                  00006100
 66                              ;               .SBTTL  LITON      SETS PANEL LIGHTS                               00006101
 67                              ;                                                                                  00006200
 68                              ;       CALL LITON(ILITE)                                                          00006300
 69                              ;                                                                                  00006400
 70  C00050                                        .GLOBL  LITON                                                    00006500
 71  C00050  057537  000002  167764 LITON:         BIS    @2(%5),@#167764                                           00006700
 72  C00056  000207                                 RTS    %7                                                       00006800
 73                              ;                                                                                  00006900
 74                              ;                                                                                  00007000
 75                              ; -.-.-.-.-.-.-.-.-.-.-.-.-.-.-.-.-.-.-                                            00007100
 76                              ;                                                                                  00007200
 77                              ;               .SBTTL  LITOFF     KILLS PANEL LIGHTS                              00007201
 78                              ;                                                                                  00007300
 79                              ;       CALL LITOFF(ILITE)                                                         00007400
 80                              ;                                                                                  00007500
 81  C00060                                        .GLOBL  LITOFF                                                   00007600
 82  C00060  047537  000002  167764 LITOFF:        BIC    @2(%5),@#167764                                           00007800
 83  C00066  000207                                 RTS    %7                                                       00007900
 84                              ;                                                                                  00008000
 85                              ;                                                                                  00008100
 86                              ; -.-.-.-.-.-.-.-.-.-.-.-.-.-.-.-.-.-.-                                            00008200
 87                              ;               .SBTTL  SETUP      SETS UP INT SERVICE SUB                         00008301
 88                              ;                                                                                  00008400
 89                              ;       CALL SETUP(IFLAG,KCMD,L,ISTOP)                                             00008500
 90                              ;                                                                                  00008600
 91                              ;                                                                                  00008700
 92  C00070                                        .GLOBL  SETUP                                                    00008800
 93  C00070  012767  000136' 000140' SETUP:        MOV    #INTSRV,140         ;INTERRUPT VECTOR FOR INTERFACE       00008900
 94  C00076  012767  000200  000142'               MOV    #200,142            ;SUBROUTINE STATUS LEVEL IS 4         00009000
 95  C00104  016567  000002  000130                MOV    2(%5),FLAGAD        ;ADDR OF 'IFLAG' IN 'FLAGAD'          00009100
 96  C00112  016567  000004  000126                MOV    4(%5),CMDAD         ;ADDR OF 'KCMD' IN 'KCMDAD'           00009200
 97  C00120  016567  000006  000122                MOV    6(%5),DOPLAD        ;ADDR OF DOPPLER COUNT VARIABLE       00009300
 98                              ;                                           ; USED BY FORTRAN IN 'DOPLAD'          00009400
 99  C00126  016567  000010  000110                MOV    8.(%5),STOPAD       ;ADDR OF 'ISTOP' IN 'STOPAD'          00009500
100  C00134  000207                                 RTS    %7                                                       00009600
101                              ;                                                                                  00009700
102                              ;       INTERRUPT SERVICE SUBROUTINE                                               00009800
103                              ;                                                                                  00009900
104  C00136                     INTSRV:                                                                             00010000
105  C00136  005777  000100                        TST    @FLAGAD             ;'IFLAG' NOT YET CLEARED?            00010100
106                              ;                                           ; THEN COMMAND NOT YET READY.          00010200
107  C00142  001404                                 BEQ    INT1                                                     00010300
108  C00144  012701  000173                         MOV    #123.,%1            ;BOMB OUT WITH LIGHT DISPLAY         00010400
109  C00150  000167  000114                         JMP    FAIL1               ; IF FLAG NOT CLEARED.               00010500
110  C00154                     INT1:                                                                               00010600
111  C00154  013767  167762  000070                MOV    @#167762,LOCMND     ;READ BACK CURRENT COMMAND            00010700
112  C00162  042767  103777  000062                BIC    #3777,LOCMND        ;LEAVE LIGHTS AND INT ENABLE SET      00010800
113  C00170  057767  000052  000054                BIS    @CMDAD,LOCMND       ;SET IN CURRENT COMMAND               00010900
114  C00176  016737  000050  167762                MOV    LOCMND,@#167762     ;SEND WHOLE MESS TO COMMAND REG       00011000
```

```
                    SETS UP INT SERVICE SUB

115 C00204  005277  000032              INC    aFLAGAD         ;SET FLAG TO SHOW INT. OCCURRED   00011100
116 C00210  013777  167774  000032      MOV    a#167774,aDOPLAD ;READ DOPPLER COUNT             00011200
117 C00216  032737  000020  167766      BIT    #20,a#167766    ;SEE IF 'STOP' BUTTON HIT        00011300
118 C00224  001005                      BNE    INTXIT                                           00011450
119 C00226  042737  012000  167762      BIC    #12000,a#167762 ;CLEAR 'PASS STARTED', 'FF CN'   00011470
120 C00234  005277  000004              INC    aSTOPAD         ;SET 'ISTOP' EQUAL TO '1'        00011500
121 C00240  000002          INTXIT:     RTI                    ;  AND RETURN TO PROGRAM         00011650
122                                                            ;                                00011700
123                                                                                             00011800
124 C00242  000000          FLAGAD: 0                          ;ADDRESS OF 'IFLAG' IN FORTRAN   00011900
125 C00244  000000          STOPAD: 0                          ;ADDRESS OF 'ISTOP' IN FORTRAN   00012000
126 C00246  000000          CMDADD: 0                          ;ADDRESS OF 'NCMD' IN FORTRAN    00012100
127 C00250  000000          DOPLAD: 0                          ;ADDRESS OF DOPPLER VAR IN FORT  00012200
128 C00252  000000          LOCMAD: 0                          ;LOCAL COMMAND. ALLOWS LS TO     00012300
129                                                            ;  BUILD UP COMMAND HERE TO      00012400
130                                                            ;  PREVENT ZAPPING INT ENABLE    00012500
131                                                                                             00012600
132                                     ; - . - . - . - . - . - . - . - . - . - . - . - . -    00012700
133                                     ;                                                       00012800
134                                     .SBTTL STATOT    SETS BITS IN STATUS REGISTER           00012901
135                                     ;                                                       00013000
136                                     ;  CALL STATOT(ILITE)                                   00013100
137                                     ;                                                       00013200
138                                     .GLOBL STATOT                                           00013300
139 C00254                  STATOT:                                                             00013400
140 C00254  057537  C00002  167762      BIS    @2(5),a#167762                                   00013500
141 C00262  000207                      RTS    %7                                               00013600
142                                                                                             00013700
143                                     ; - . - . - . - . - . - . - . - . - . - . - . - . -    00013800
144                                     ;                                                       00013900
145                                     .SBTTL FAIL     SETS 'FAIL' CODE IN LIGHTS              00014001
146                                                                                             00014100
147                                     ;   FAIL CODE DISPLAYED AS                              00014200
148                                                                                             00014300
149                                                                                             00014400
150                                     ; |00|C000|C00C|C000|C000|                              00014500
151                                                                                             00014600
152                                     ;  <----- FAIL CODE ----->                              00014700
153                                                                                             00014800
154                                                                                             00014900
155                                     ;   CALL FAIL(IFAIL)                                    00015000
156                                     ;                                                       00015100
157                                                                                             00015200
158                                     .GLOBL FAIL                                             00015300
159                                     .GLOBL RESTRT                                           00015400
160 C00264                  FAIL:                                                               00015500
161 C00264  017501  000002              MOV    @2(5),%1         ;"IFAIL" -> R1                  00015600
162 C00270                  FAIL1:                                                              00015700
163 C00270  052737  040000  167762      BIS    #40000,a#167762  ;SET "FAIL" LIGHT               00015800
164 C00276  042737  100100  167762      BIC    #100100,a#167762 ;CLEAR INT, TUNE ENABLES        00015820
165 C00304  005067  177742              CLR    LOCMND           ;FAIL CODE BUILT HERE IN BCD    00015900
166 C00310  005000                      CLR    %0               ;PREPARE FOR INTEGER DIVIDE     00016000
167 C00312  071027  000144              DIV    #100.,%0                                         00016100
168 C00316  032700  000001              BIT    #1,%0                                            00016200
169 C00322  001403                      BEQ    .+10                                             00016300
170 C00324  052737  000010  167766      BIS    #10,a#167766                                     00016400
171 C00332  005000                      CLR    %0                                               00016500

SETS "FAIL" CODE IN LIGHTS

172 C00334  071027  000012              DIV    #10.,%0                                          00016600
173 C00340  072027  000012              ASH    #12,%0           ;FAIL CODE - BCD TENS           00016700
174 C00344  072127  000010              ASH    #10,%1           ;FAIL CODE - BCD UNITS          00016800
175 C00350  060067  177676              ADD    %0,LOCMND                                        00016900
176 C00354  060167  177672              ADD    %1,LOCMND                                        00017000
177 C00360  016737  177666  167764      MOV    LOCMND,a#167764  ;SEND TO LIGHTS                 00017100
178                                                                                             00017200
179                                     ;   TIME OUT 4 SECONDS BEFORE CLEARING 'START' FLOP     00017300
180                                                                                             00017400
182 C00366  012700  000023              MOV    #19.,%0                                          00017500
183 C00372                  TIMELP:                                                             00017600
184 C00372  012767  056370  177652      MOV    #23800.,LOCMND                                   00017700
185 C00400  005367  177646              DEC    LOCMND           ;2.65 + 3.46 MICROSECONDS       00017800
186 C00404  003375                      BGT    .-4              ;2.65 MICROSECONDS              00017900
187 C00406  005300                      DEC    %0                                               00018000
188 C00410  003370                      BGT    TIMELP                                           00018100
189                                                                                             00018200
190                                     ;   4 SECONDS UP                                        00018300
191                                                                                             00018400
192 C00412  000167  040000G             JMP    40000+RESTRT                                     00018500
193                                     ;                                                       
194                                     ; - . - . - . - . - . - . - . - . - . - . - . - . -    
195                                                                                             
196                                     .SBTTL DELAY     HOLDS DELAY FOR RECEIVERS              
197                                                                                             
198                                     ;  CALL DELAY(XDELAY)                                   
199                                                                                             
200                                     .GLOBL DELAY                                            
201 C00416                  DELAY:                                                              
202 C00416  016500  000002              MOV    2(5),%0          ;ADDRESS OF XDELAY IN R0        
203 C00422  01672C  C00006              MOV    DELHI,(0)+       ;HIGH ORDER PART OF DELAY       
204 C00426  01671C  000004              MOV    DELHI+2,(0)      ;LOW ORDER PART                 
205 C00432  000207                      RTS    %7                                               
206                                                                                             
207 C00434  034474  137142  DELHI:      .FLT2  4.5E-5                                           
208                                                                                             
209         000001*                     .END                                             00018600
```

```
  1                                         .TITLE  PRINT1
  2                                    ; PRINT1 - PRINT SUBROUTINE FOR SATNAV ERROR PRINT.
  3
  4                                    ;  SIMULATES
  5                                    ;   SUBROUTINE PRINT1(M,ILANT)
  6                                    ;   DIMENSION ILANT(100)
  7
  8                                    ;  PRINT-OUT IS:
  9                                    ;   SEGMENT ERROR
 10                                    ;     1      1.03
 11                                    ;     2     -0.05
 12                                    ;    ...     ...
 13                                    ;    4C      C.12
 14
 15                                    ;   SUM OF ERRORS = -C000.05
 16
 17                                         .GLOBL  PRINT1
 18          000000'                        .CSECT
 19          000015                         CR=15
 20          000012                         LF=12
 21          177560                         TKS=177560
 22          177562                         TKB=177562
 23          177564                         TPS=177564
 24          177566                         TPB=177566
 25                                    ;
 26 000000
 27 000000  010067  000526        PRINT1:   MOV    %0,SAVE0
 28 000004  010167  000524                  MOV    %1,SAVE1
 29 000010  010267  000522                  MOV    %2,SAVE2
 30 000014  010367  000520                  MOV    %3,SAVE3
 31 000020  010467  000516                  MOV    %4,SAVE4
 32 000024  017567  000002  000512          MOV    @2(5),M        ;"M" STORED IN M
 33 000032  016567  000004  000506          MOV    4(5),ILANT     ;ADDRESS OF ILANT IN ILANT
 34 000040  012705  000550'                 MOV    #MSG01,%5      ; SEGMENT ERROR
 35 000044  004767  000426                  JSR    %7,TYPOUT
 36 000050  112767  000061  000525          MOVB   #61,SEGNO+1    ;ASCII '1'
 37 000056  112767  000040  000516          MOVB   #40,SEGNO      ;SPACE
 38 000064  005004                          CLR    %4             ;R4 COUNTS INDEX OF M
 39 000066  016700  000454                  MOV    ILANT,%0       ;R0 TRACKS ILANT
 40 000072  112767  000040  000507 PRTLP1:  MOVB   #40,SIGN       ;SPACE IN SIGN BIT
 41 000100  112767  000040  000502          MOVB   #' ,ERRVAL
 42 000106  012001                          MOV    (0)+,%1
 43 000110  002004                          BGE    .+10.
 44 000112  005401                          NEG    %1
 45 000114  112767  000055  000465          MOVB   #'-,SIGN
 46 000122  020127  000144                  CMP    %1,#100.       ;IF NUM >100., NO PRINTEE
 47 000126  002040                          BGE    ASTIN          ;PRINT ASTERIX
 48 000130  010103                          MOV    %1,%3
 49 000132  005002                          CLR    %2             ;SET UP FOR HARDWARE INTEGER DIVIDE
 50 000134  071227  000012                  DIV    #10.,%2
 51 000140  001404                          BEQ    .+10.
 52 000142  062702  000060                  ADD    #60,%2         ;ASCII ZERO
 53 000146  110267  000436                  MOVB   %2,ERRVAL
 54 000152  062703  000060                  ADD    #60,%3         ;ASCII ZERO
 55 000156  110367  000427                  MOVB   %3,ERRVAL+1
 56 000162  012001                   PRTB:  MOV    (0)+,%1
 57 000164  002004                          BGE    .+10.
 58 000166  112767  000055  000413          MOVB   #'-,SIGN       ;FRACTIONAL PART IS POLARIZED
 59 000174  005401                          NEG    %1
 60 000176  010103                          MOV    %1,%3
 61 000200  005002                          CLR    %2
 62 000202  071227  000012                  DIV    #10.,%2
 63 000206  062702  000060                  ADD    #'0,%2
 64 000212  062703  000060                  ADD    #'0,%3
 65 000216  110267  000371                  MOVB   %2,ERRFRC
 66 000222  110367  000366                  MOVB   %3,ERRFRC+1
 67 000226  000405                          BR     PRTF
 68
 69 000230  112767  000052  000351 ASTIN:   MOVB   #52,SIGN       ;ASCII ASTERIX. USED FOR |NUM|>100.
 70 000236  105067  000346                  CLRB   SIGN+1
 71 000242  012705  000576'          PRTF:  MOV    #DAT01,%5
 72 000246  004767  000224                  JSR    %7,TYPOUT      ;TYPE OUT ERROR LINE
 73                                    ;
 74                                    ;        INCREASE SEGMENT NUMBER IN ASCII
 75 000252  105267  000325                  INCB   SEGNO+1
 76 000256  126727  000321  000071          CMPB   SEGNO+1,#'9
 77 000264  003414                          BLE    PRTG
 78 000266  112767  000060  000307          MOVB   #'0,SEGNO+1
 79 000274  126727  000302  000040          CMPB   SEGNO,#40      ;WAS THIS A SPACE
 80 000302  001003                          BNE    .+8.
 81 000304  112767  000060  000270          MOVB   #'0,SEGNO
 82 000312  105267  000264                  INCB   SEGNO          ;INCREASE TENS
 83 000316  005204                   PRTG:  INC    %4             ;POINT TO NEXT VALUE OF M
 84 000320  020467  000220                  CMP    %4,M
 85 000324  002662                          BLT    PRTLP1
 86
 87                                    ;    ALL ERROR PRINTING DONE
 88                                    ;    NOW PRINT SUM OF ERRORS
 89                                    ;
 90 000326  012003                          MOV    (0)+,%3        ;PICK UP INTEGER PART OF SUM
 91 000330  001421                          BEQ    PRTH
 92 000332  002004                          BGE    .+10.          ;IF NEGATIVE, SET SIGN BIT
 93 000334  112767  000055  000305          MOVB   #'-,SUMERR
 94 000342  005403                          NEG    %3
 95 000344  005002                          CLR    %2             ;PREPARE FOR DIVISION
 96 000346  012701  000655'                 MOV    #SUMERR+6,%1   ;ADDRESS SUMERR BY AUTODECREMENT
 97 000352  071227  000012          PRTC:   DIV    #10.,%2
 98 000356  062703  000060                  ADD    #'0,%3
 99 000362  110341                          MOVB   %3,-(1)
100 000364  010203                          MOV    %2,%3
101 000366  001402                          BEQ    PRTH
102 000370  005002                          CLR    %2
103 000372  000767                          BR     PRTC
104                                    ;
105 000374  012003                   PRTH:  MOV    (0)+,%3
106 000376  001420                          BEQ    PRTL
107 000400  003004                          BGT    .+10.
108 000402  005403                          NEG    %3
```

```
109 C00404  112767  C00055  000235          MCVB    #'-,SUMERR
110 C00412  005002                          CLR     %2
111 000414  071227  000012                  DIV     #10.,%2
112 C00420  062702  0C0060                  ADD     #'0,%2
113 C00424  062703  CC0060                  ADD     #'0,%3
114 C00430  110267  000222                  MCVB    %2,SUMFRC
115 C00434  110367  C00217                  MCVB    %3,SUMFRC+1
116 C00440  012705  000620'         PRTL:   MOV     #MSG02,%5
117 C00444  004767  000026                  JSR     %7,TYPOUT
118                                  ;
119                                  ;      RESTORE ALL SPACES TO MESSAGE NUMERICALS
120                                  ;
121                                  .
122                                  ;      NOW RESTORE REGISTERS
123 C00450  C167CC  000056                  MCV     SAVE0,%0
124 C00454  0167C1  000054                  MOV     SAVE1,%1
125 C00460  016702  000052                  MOV     SAVE2,%2
126 C00464  0167C3  CC0050                  MCV     SAVE3,%3
127 C00470  016704  000046                  MCV     SAVE4,%4
128 C00474  000207                          RTS     %7
129                                  ;
130                                  ;
131 C00476                           TYPOUT:
132 C00476  C16701  177564'                  MOV     TPS,%1          ;SAVE STUTAS OF PRINTER FOR FORTRAN
133 C00502  042767  C00100  177564'          BIC     #100,TPS        ;REMOVE INTERRUPT ENABLE BIT, IF ANY
134 C00510  105767  177564'         TYPE:   TSTB    TPS             ;PRINTER READY?
135 C00514  100375                          BPL     .-4
136 C00516  112567  177566'                 MOVB    (5)+,TPB
137 C00522  001372                          BNE     TYPE
138 C00524  010167  177564'                 MCV     %1,TPS          ;RESTORE PRINTER STATUS
139 C00530  000207                          RTS     %7
140 C0C532  00CCCC                  SAVEC:  0
141 C00534  000000                  SAVE1:  0
142 C00536  000000                  SAVE2:  0
143 C00540  000000                  SAVE3:  0
144 C00542  000000                  SAVE4:  0
145 C00544  C00000                  Y:      0
146 C00546  000000                  ILANT:  0                       ;ADDRESS OF ILANT IN CALLING PROGRAM
147                                  ;
148                                  ;      MESSAGES
149                                  ;
150 C00550  015     012     012     MSG01:  .ASCIZ <CR><LF><LF>' SEGMENT  ERROR'<CR><LF>
    C00553  040     123     1C5
    C00556  107     115     1C5
    C00561  116     124     040
    C00564  C40     105     122
    C00567  122     117     122
    C00572  015     012     000
151                                          .EVEN
152 C00576  040     040     C40     DATO1:  .BYTE   40,40,40,40
    C00601  040
153 C00602  04C     040             SEGNC:  .BYTE   40,40
154 C00604  040     040     C40             .BYTE   40,40,40
155 C00607  040                     SIGN:   .BYTE   40
156 C00610  04C     060             ERRVAL: .BYTE   40,60
157 000612  056                             .BYTE   56              ;ASCII PERIOD
158 C00613  06C     060     015     FRRFRC: .BYTE   60,60,15,12,0   ;MESSAGE ENDS WITH CR, LF, DELIMITER
    C00614  012     000
159                                          .EVEN
160 C00620  012     040     040     MSG02:  .ASCII <LF>'     SUM OF ERRORS = '
    C00623  040     040     C40
    C00626  040     123     125
    C00631  115     040     117
    C00634  106     040     1C5
    C00637  122     122     117
    C00642  122     123     040
    C00645  075     040
161 C00647  040     040     C40     SUMERR: .BYTE   40,40,40,40,40,60
    C00652  040     040     060
162 C00655  056                             .BYTE   56              ;PERIOD
163 C00656  060     060     C15     SUMFRC: .BYTE   60,60,15,12,12,0
    C00661  012     012     000
164         000001'                          .END
```

What is claimed is:

1. A microcomputer-controlled portable satellite signal simulator for generating a simulated Doppler-shifted signal that would have emanated from a TRANSIT navigation satellite of predetermined orbit, said signal containing appropriate modulated navigation message data for testing operational parameters of a satellite navigation receiver system in operational proximity to said simulator at a known position A, comprising:

a microcomputer system including a microprocessor for generating a series of multi-bit command words each word including pseudo-pass message and signal modulation control bits, and an I/O but connecting to a plurality of ports;

controller/transmitter circuitry including input encoding means for encoding into said microprocessor digital data related to said known position A, an interface/controller circuit having first and second I/O terminals connected between one of said plurality of ports of said I/O bus and said input encoding means, and transmitter circuitry means connected to said interface/controller circuit for controllably generating, based on said series of multi-bit words, a simulated Doppler-shifted signal to simulated operation of said pseudo-orbiting TRANSIT navigation satellite whereby said parameters associated with said satellite navigation receiver system can be accurately evaluated.

2. The simulator of claim 1 in which said microprocessor includes a CPU for calculating, from proposed dynamic change in position of said pseudo-orbiting satellite relative to said position A, a plurality of Doppler-shifted frequency and slope values, said values being calculated prior to formulation and use of said series of multi-bit command words for controllably generating said simulated Doppler-shifted signal at said transmitter circuitry means.

3. The simulator of claim 2 with the addition of means associated with said microcomputer system for comparing, for each executed multi-bit command word, generated and calculated Doppler-shifted frequency-vs.-time values and then generating a compensating error signal to be associated with signal emission control bits in a next-in-time command word to be used in generating said simulated Doppler signal, whereby differences in said generated and calculated frequency count values of said prior-executed command word are compensated.

4. The simulator of claim 1 with the addition of display means connected to one of I/O terminals of said interface/controller circuit whereby status and error messages associated with said simulator can be visually displayed for evaluation and analysis.

5. A method for generating a simulated modulated Doppler-shifted signal that would have emanated from a TRANSIT navigation satellite of predetermined orbit, said signal containing appropriate modulated navigation message data for testing operational parameters of a satellite navigation receiver system in operational proximity to said simulator at position A, comprising:

encoding as digital code data local latitude and longitude of said position A, said data being encoded into a microprocessor of a portable microcomputer system;

calculating in said microprocessor, based on proposed changes in dynamic position of said pseudo-orbiting satellite relative to said position A, a plurality of Doppler-shifted frequency values associated with operation of said pseudo-orbiting satellite;

generating as a function of a series of interrupt signals from an external circuit associated with a transmitter circuit, a series of multi-bit command words each including pseudo pass message and signal modulation control bits;

controllably generating a simulated Doppler-shifted signal based on said series of multi-bit command words by means of said transmitter circuit whereby said parameters associated with said satellite navigation receiver system can be accurately evaluated.

6. The method of claim 5 in which said step of generating as a function of series of interrupt signals, a series of multi-bit command words, includes:

controlling each subsequent command word as a function of each prior-executed command word whereby errors in said executed word can be compensated.

7. The method of claim 6 in which said last-mentioned step includes:

comparing generated Doppler frequency values with calculated frequency values associated with said executed word, generating compensating digital signals within said microprocessor based on said comparison, and merging said compensating signal with slope control bits associated with calculated Doppler slope values of said subsequent command word whereby errors in said executed command word are compensated by changes in modulation control bits associated with said subsequent word.

8. The method of claim 5 with the additional step of comparing encoded local longitude and latitude values with positional fix values calculated by said satellite navigation receiver system undergoing test.

9. A method for generating simulated Doppler-shifted signals that would have emanated from a TRANSIT navigation satellite of predetermined orbit, said signal containing appropriately modulated navigation message data for testing operational parameters of satellite navigation receiver system in operational proximity to said simulator at a position A, comprising:

encoding data related to local latitude and longitude of said position A into a microcompressor of a portable microcomputer system;

generating based on a series of interrupt signals from an external circuit associated with a transmitter circuit, a series of multi-bit command words each including pass message and signal modulation control bits; and controllably generating a simulated Doppler-shifted signal based on said series of multi-bit command words whereby said parameters associated with said satellite navigation receiver system can be accurately evaluated.

10. The method of claim 9 in which the step of generating said multi-bit command words includes monitoring generated Doppler-shifted frequency values with calculated values followed by generating a compensating error signal for merging with control bits associated with a next-in-time subsequent word.

* * * * *